US010582551B2

(12) United States Patent
Zhu et al.

(10) Patent No.: US 10,582,551 B2
(45) Date of Patent: Mar. 3, 2020

(54) CORE NETWORK CONTROL PLANE DEVICE SELECTION METHOD AND APPARATUS

(71) Applicant: HUAWEI TECHNOLOGIES CO., LTD., Shenzhen, Guangdong (CN)

(72) Inventors: Fangyuan Zhu, Beijing (CN); Fang Yu, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 16/100,877

(22) Filed: Aug. 10, 2018

(65) Prior Publication Data

US 2018/0352592 A1    Dec. 6, 2018

Related U.S. Application Data

(63) Continuation of application No. PCT/CN2018/075372, filed on Feb. 6, 2018.

(30) Foreign Application Priority Data

Mar. 17, 2017    (CN) .......................... 2017 1 0162069

(51) Int. Cl.
*H04L 5/00*    (2006.01)
*H04W 8/20*    (2009.01)
(Continued)

(52) U.S. Cl.
CPC ........... *H04W 76/11* (2018.02); *H04L 5/0053* (2013.01); *H04W 8/20* (2013.01); *H04W 8/24* (2013.01);
(Continued)

(58) Field of Classification Search
CPC .. H04L 5/003–0053; H04W 8/005–30; H04W 12/08–0808; H04W 28/02–26;
(Continued)

(56) References Cited

U.S. PATENT DOCUMENTS

2010/0323700 A1* 12/2010 Bachmann ........ H04W 36/0066
455/436
2015/0365851 A1* 12/2015 Wang ................ H04W 36/0022
455/439
(Continued)

FOREIGN PATENT DOCUMENTS

CN    101001184 A    7/2007
CN    106060900 A    10/2016
(Continued)

OTHER PUBLICATIONS

ZTE et al: "Proposed Network Slicing Update to 23 .501 Clause 5.15", 3GPP Draft, S2-171622, vol. SA WG2, no.Dubrovnik, Croatia; Feb. 18, 2017, XP051240839, 4 pages.
(Continued)

*Primary Examiner* — Timothy J Weidner
(74) *Attorney, Agent, or Firm* — Fish & Richardson P.C.

(57) ABSTRACT

This application provides a core network control plane device selection method and apparatus. The method includes: obtaining, by a source core network control plane device, first network slice selection assistance information of a terminal device; and if the source core network control plane device cannot determine a target core network control plane device indexed by the first network slice selection assistance information, sending, by the source core network control plane device, the first network slice selection assistance information and first indication information to the terminal device, to trigger the terminal device to send a first registration request message. The first indication information indicates that a temporary identifier of the terminal device is invalid, and the first registration request message carries the first network slice selection assistance information and a permanent identifier of the terminal device.

13 Claims, 8 Drawing Sheets

(51) Int. Cl.
| | |
|---|---|
| *H04W 8/24* | (2009.01) |
| *H04W 8/26* | (2009.01) |
| *H04W 12/08* | (2009.01) |
| *H04W 28/02* | (2009.01) |
| *H04W 28/08* | (2009.01) |
| *H04W 36/00* | (2009.01) |
| *H04W 36/10* | (2009.01) |
| *H04W 36/36* | (2009.01) |
| *H04W 36/38* | (2009.01) |
| *H04W 40/24* | (2009.01) |
| *H04W 48/16* | (2009.01) |
| *H04W 48/18* | (2009.01) |
| *H04W 60/04* | (2009.01) |
| *H04W 60/06* | (2009.01) |
| *H04W 72/04* | (2009.01) |
| *H04W 76/11* | (2018.01) |
| *H04W 76/27* | (2018.01) |
| *H04W 84/04* | (2009.01) |
| *H04W 88/06* | (2009.01) |
| *H04W 88/12* | (2009.01) |
| *H04W 88/14* | (2009.01) |
| *H04W 92/10* | (2009.01) |

(52) U.S. Cl.
CPC ............. *H04W 8/26* (2013.01); *H04W 12/08* (2013.01); *H04W 28/0247* (2013.01); *H04W 28/08* (2013.01); *H04W 36/0011* (2013.01); *H04W 36/0033* (2013.01); *H04W 36/10* (2013.01); *H04W 36/36* (2013.01); *H04W 36/38* (2013.01); *H04W 40/248* (2013.01); *H04W 48/16* (2013.01); *H04W 48/18* (2013.01); *H04W 60/04* (2013.01); *H04W 60/06* (2013.01); *H04W 72/0406* (2013.01); *H04W 76/27* (2018.02); *H04W 84/042* (2013.01); *H04W 88/06* (2013.01); *H04W 88/12* (2013.01); *H04W 88/14* (2013.01); *H04W 92/10* (2013.01)

(58) Field of Classification Search
CPC ........... H04W 36/0005–385; H04W 40/24–38; H04W 48/02–20; H04W 60/005–06; H04W 72/04–0433; H04W 72/1278–14; H04W 74/002–006; H04W 76/10–38; H04W 84/02; H04W 84/04–045; H04W 88/02; H04W 88/06–18; H04W 92/02; H04W 92/04–14
See application file for complete search history.

(56) References Cited

U.S. PATENT DOCUMENTS

| | | | |
|---|---|---|---|
| 2016/0029047 | A1 | 1/2016 | Spidella et al. |
| 2018/0227873 | A1* | 8/2018 | Vrzic .................... H04W 60/04 455/435.1 |
| 2019/0124561 | A1* | 4/2019 | Faccin .................. H04W 76/16 370/331 |
| 2019/0230556 | A1* | 7/2019 | Lee ........................ H04W 16/02 709/223 |

FOREIGN PATENT DOCUMENTS

| | | |
|---|---|---|
| CN | 106375987 A | 2/2017 |
| CN | 106412905 A | 2/2017 |
| EP | 3327992 A1 | 5/2018 |

OTHER PUBLICATIONS

Ericsson: "23 .502:Registration procedures updates", S2-171567, Feb. 18, 2017, XP051240798, 8 pages.
LG Electronics:"Interim agreements on the network slice re-selection", 3GPP Draft; S2-166474, Nov. 14, 2016, XP051185034, 8 pages.
Samsung et al:"UE triggered network slice change", 3GFP Draft;S2-170257, vol. SA WG2, no.Spokane, USA; Jan. 16, 2017, XP051216446, 2 pages.
Extended European Search Report in European Appln. No. 18746065.4, dated Apr. 24, 2019, 11 pages.
3GPP TR 23.711 V14.0.0 (Sep. 2016),3rd Generation Partnership Project,Technical Specification Group Services and System Aspects;Enhancements of Dedicated Core Networks selection mechanism(Release 14),total 36 pages.
3GPP TS 23.401 V14.3.0 (Mar. 2017),3rd Generation Partnership Project;Technical Specification Group Services and System Aspects;General Packet Radio Service (GPRS) enhancements for Evolved Universal Terrestrial Radio Access Network (E-UTRAN) access (Release 14),total 386 pages.
3GPP TS 23.501 V0.3.1 (Mar. 2017),3rd Generation Partnership Project;Technical Specification Group Services and System Aspects-;System Architecture for the 5G System;Stage 2(Release 15),total 97 pages.
3GPP TS 23.502 V0.2.0 (Feb. 2017),3rd Generation Partnership Project;Technical Specification Group Services and System Aspects;Procedures for the 5G System;Stage 2(Release 15),total 71 pages.
3GPP TS 23.003 V13.8.0 (Dec. 2016),3rd Generation Partnership Project;Technical Specification Group Core Network and Terminals;Numbering, addressing and identification(Release 13),total 103 pages.
International Search Report and Written Opinion issued in International Application No. PCT/CN2018/075372 dated Apr. 23, 2018, 12 pages.

* cited by examiner

CORE NETWORK CONTROL PLANE DEVICE SELECTION METHOD AND APPARATUS

CROSS-REFERENCE TO RELATED APPLICATIONS

This application is a continuation of International Application No. PCT/CN2018/075372, filed on Feb. 6, 2018, which claims priority to Chinese Patent Application No. 201710162069.8, filed on Mar. 17, 2017, the disclosures of which are hereby incorporated by reference in their entireties.

TECHNICAL FIELD

This application relates to the communications field, and in particular, to a core network control plane device selection method and apparatus.

BACKGROUND

A network slicing technology is a technology of providing a plurality of virtual logical network slices on a same network infrastructure by using a virtualized network function (VNF). Different types of network slices have different network features in terms of function, performance, security, operation and maintenance, and the like, so that different user equipments can access different network slices based on requirements of the user equipments, thereby ensuring quality of service requirements of different services.

A user equipment needs to register with a management device to access a network slice. Usually, a source network slice accessed by user equipment and a source management device with which the user equipment registers are determined based on subscription data of the user equipment. When the subscription data of the user equipment changes, the source network slice accessed by the user equipment may not satisfy a requirement of the user equipment. In this case, the user equipment needs to be triggered, based on updated subscription data of the user equipment, to initiate a redirection procedure, so that the user equipment can be redirected to a new management device in a new network slice.

In the foregoing redirection process of a terminal device, a source management device may determine a target management device in a target network slice based on subscription data. The source management device stores context information of the terminal device. Therefore, a new management device may request the source management device for a context of the terminal device. However, when a source network slice and a new network slice need to be isolated from each other, the source network slice cannot determine the target network slice based on the subscription data sometimes. In this case, if the terminal device still uses the foregoing redirection method, the new management device accesses the source management device to obtain the context of the terminal device, affecting isolation between the source network slice and the new network slice and reducing security of the network slice.

SUMMARY

This application provides a core network control plane device selection method and apparatus, to resolve a problem that security of a network slice is affected in a redirection process of a conventional terminal device.

According to a first aspect, this application provides a core network control plane device selection method, including:

obtaining, by a source core network control plane device, first network slice selection assistance information of a terminal device; and if the source core network control plane device cannot determine a target core network control plane device indexed by the first network slice selection assistance information, sending, by the source core network control plane device, the first network slice selection assistance information and first indication information to the terminal device, to trigger the terminal device to send a first registration request message, where the first indication information is used to indicate that a temporary identifier of the terminal device is invalid, and the first registration request message carries the first network slice selection assistance information and a permanent identifier of the terminal device.

After the source core network control plane device receives the first NSSAI indicating the target core network control plane device, if the source core network control plane device cannot determine the target core network control plane device indexed by the first NSSAI, the source core network control plane device sends, to the terminal device, the first indication information used to indicate that the temporary identifier of the terminal device is invalid, so that the terminal device sends the registration request message carrying the first NSSAI and the permanent identifier of the terminal device to an access network device. Therefore, a target core network device does not need to request context information of the terminal device from the source core network control plane device after receiving the temporary identifier, information exchange between the source core network control plane device and the target core network control plane device is avoided, security between network slices is improved, procedure efficiency of redirecting the terminal device to the target core network control plane device is improved, and signaling is saved.

In a possible implementation, after the source core network control plane device learns that the source core network control plane device and the target core network control plane device need to be isolated from each other, the method further includes:

setting, by the source core network control plane device, the temporary identifier of the terminal device to be invalid.

The source core network control plane device sets the temporary identifier of the terminal device to be invalid. Therefore, when the terminal device subsequently initiates a registration request message, the registration request message no longer carries the temporary identifier of the terminal device. The target core network control plane device does not need to obtain an address of the source core network control plane device based on the temporary identifier or access the source core network control plane device to obtain a context of the terminal device, thereby improving security isolation of the network slice.

In a possible implementation, the obtaining, by a source core network control plane device, first network slice selection assistance information of a terminal device includes:

obtaining, by the source core network control plane device, subscription data of the terminal device from a subscriber data management center device; and determining, by the source core network control plane device, the first network slice selection assistance information based on the subscription data.

The source core network control plane device can obtain the first NSSAI based on the subscription data of the terminal device, and only a relatively small amount of signaling is consumed.

In a possible implementation, the obtaining, by a source core network control plane device, first network slice selection assistance information of a terminal device includes:

obtaining, by the source core network control plane device, subscription data of the terminal device from a subscriber data management center device;

sending, by the source core network control plane device, the subscription data to a default core network control plane device, to request the first network slice selection assistance information of the terminal device; and receiving, by the source core network control plane device, the first network slice selection assistance information from the default core network control plane device.

When the source core network control plane device cannot obtain the first NSSAI based on the subscription data, the source core network control plane device sends the subscription data to the default core network control plane device, so that the default core network control plane device obtains the first NSSAI based on the subscription data, and sends the first NSSAI to the source core network control plane device. This resolves a problem of unsuccessful redirection of the terminal device that may be caused when the source core network control plane device cannot obtain the first NSSAI based on the subscription data.

In a possible implementation, before the source core network control plane device cannot determine the target core network control plane device indexed by the first network slice selection assistance information, the method further includes:

determining, by the source core network control plane device based on the first network slice selection assistance information, that the source core network control plane device cannot continue to serve the terminal device.

In a possible implementation, the method further includes:

receiving, by the source core network control plane device, a second registration request message from the terminal device, where the second registration request message carries second network slice selection assistance information, and the second network slice selection assistance information is used to index the source core network control plane device.

In a possible implementation, the determining, by the source core network control plane device based on the first network slice selection assistance information, that the source core network control plane device cannot continue to serve the terminal device includes:

when the source core network control plane device determines that a slice type or a service type associated with the first network slice selection assistance information is not included in a slice type or a service type associated with the second network slice selection assistance information, determining, by the source core network control plane device, that the source core network control plane device cannot continue to serve the terminal device.

In a possible implementation, that the source core network control plane device cannot determine a target core network control plane device indexed by the first network slice selection assistance information includes:

sending, by the source core network control plane device, the first network slice selection assistance information to a default core network control plane device, to request the target core network control plane device indexed by the first network slice selection assistance information, where if the request fails, the source core network control plane device cannot determine the target core network control plane device indexed by the first network slice selection assistance information.

In a possible implementation, after the sending, by the source core network control plane device, the first network slice selection assistance information and first indication information to the terminal device, the method further includes:

deregistering, by the source core network control plane device, the terminal device from the source core network control plane device.

The terminal device is deregistered from the source core network control plane device, so that the source core network control plane device no longer provides a service for the terminal device, thereby avoiding service interaction between different network slices, and improving security.

In a possible implementation, the deregistering, by the source core network control plane device, the terminal device from the source core network control plane device includes:

deleting, by the source core network control plane device, context information of the terminal device that is stored on the source core network control plane device.

According to a second aspect, this application provides a core network control plane device selection method, which is a terminal-device-side method corresponding to the core network control plane device selection method provided in the first aspect, and includes:

receiving, by a terminal device, first network slice selection assistance information and first indication information from a source core network control plane device, where the first network slice selection assistance information is used to index a target core network control plane device, and the first indication information is used to indicate that a temporary identifier of the terminal device is invalid; and sending, by the terminal device, a first registration request message to an access network device based on the first network slice selection assistance information and the first indication information, where the first registration request message carries the first network slice selection assistance information and a permanent identifier of the terminal device.

According to a third aspect, this application provides a core network control plane device selection method, including:

determining, by a source core network control plane device, whether first network slice selection assistance information can be determined, where the first network slice selection assistance information is used to index a target core network control plane device; and if the source core network control plane device cannot determine the first network slice selection assistance information, sending, by the source core network control plane device, third network slice selection assistance information and first indication information to a terminal device, to trigger the terminal device to send a third registration request message, where the first indication information is used to indicate that a temporary identifier of the terminal device is invalid, the third network slice selection assistance information is used to index a default core network control plane device, and the third registration request message carries the third network slice selection assistance information and a permanent identifier of the terminal device.

In a possible implementation, after the sending, by the source core network control plane device, third network slice selection assistance information and first indication information to a terminal device, the method further includes:

setting, by the source core network control plane device, the temporary identifier of the terminal device to be invalid.

In a possible implementation, after the sending, by the source core network control plane device, third network slice selection assistance information and first indication information to a terminal device, the method further includes:

deregistering, by the source core network control plane device, the terminal device from the source core network control plane device.

According to a fourth aspect, this application provides a core network control plane device selection method, which is a terminal-device-side method corresponding to the core network control plane device selection method provided in the third aspect, and includes:

receiving, by a terminal device, third network slice selection assistance information and first indication information from a source core network control plane device, where the third network slice selection assistance information is used to index a default core network control plane device, and the first indication information is used to indicate that a temporary identifier of the terminal device is invalid; and sending, by the terminal device, a third registration request message to an access network device based on the third network slice selection assistance information and the first indication information, where the third registration request message carries the third network slice selection assistance information and a permanent identifier of the terminal device.

According to a fifth aspect, this application provides a core network control plane device selection method, which is a method on a default core network control plane device side and corresponding to the core network control plane device selection method provided in the third aspect, and includes:

receiving, by a default core network control plane device, a third registration request message from an access network device, where the third registration request message carries a permanent identifier of a terminal device;

obtaining, by the default core network control plane device, subscription data of the terminal device from a subscriber data management center device based on the permanent identifier;

determining, by the default core network control plane device, a target core network control plane device of the terminal device based on the subscription data; and redirecting, by the default core network control plane device, the terminal device to the target core network control plane device.

In a possible implementation, the redirecting, by the default core network control plane device, the terminal device to the target core network control plane device includes:

sending, by the default core network control plane device, a first redirection indication message to the access network device, where the first redirection indication message is used to trigger the access network device to redirect the terminal device to the target core network control plane device; or sending, by the default core network control plane device, a second redirection indication message to the target core network control plane device, where the second redirection indication message is used to trigger the target core network control plane device to complete redirection of the terminal device.

A sixth aspect to a tenth aspect of this application further provide a core network control plane device and a terminal device that are respectively configured to perform the core network control plane device selection methods in the first to the fifth aspects. The core network control plane device and the terminal device have a same technical feature and same technical effects as the core network control plane device selection methods, and details are not described in this application again.

According to a sixth aspect, this application provides a core network control plane device, serving as a source core network control plane device, configured to perform the core network control plane device selection method in the first aspect, and including:

an obtaining module, configured to obtain first network slice selection assistance information of a terminal device; and a sending module, configured to: if the source core network control plane device cannot determine a target core network control plane device indexed by the first network slice selection assistance information, send, by the source core network control plane device, the first network slice selection assistance information and first indication information to the terminal device, to trigger the terminal device to send a first registration request message, where the first indication information is used to indicate that a temporary identifier of the terminal device is invalid, and the first registration request message carries the first network slice selection assistance information and a permanent identifier of the terminal device.

In a possible implementation, the core network control plane device further includes:

a temporary identifier setting module, configured to set the temporary identifier of the terminal device to be invalid.

In a possible implementation, the obtaining module is specifically configured to:

obtain subscription data of the terminal device from a subscriber data management center device; and determine the first network slice selection assistance information based on the subscription data.

In a possible implementation, the obtaining module is specifically configured to:

obtain subscription data of the terminal device from a subscriber data management center device;

send the subscription data to a default core network control plane device, to request the first network slice selection assistance information of the terminal device; and receive the first network slice selection assistance information from the default core network control plane device.

In a possible implementation, the core network control plane device further includes:

a service detection module, configured to determine, based on the first network slice selection assistance information, that the source core network control plane device cannot continue to serve the terminal device.

In a possible implementation, the core network control plane device further includes:

a receiving module, configured to receive a second registration request message from the terminal device, where the second registration request message carries second network slice selection assistance information, and the second network slice selection assistance information is used to index the source core network control plane device; and the service detection module is specifically configured to: when it is determined that a slice type or a service type associated with the first network slice selection assistance information is not included in a slice type or a service type associated with the second network slice selection assistance information, determine that the source core network control plane device cannot continue to serve the terminal device.

In a possible implementation, the core network control plane device further includes:

a target core network control plane device obtaining module, configured to: send the first network slice selection assistance information to a default core network control plane device, to request the target core network control plane device indexed by the first network slice selection assistance information; where if the request fails, it is determined that the source core network control plane device cannot determine the target core network control plane device indexed by the first network slice selection assistance information.

In a possible implementation, the core network control plane device further includes:

a deregistration module, configured to deregister the terminal device from the source core network control plane device.

In a possible implementation, the deregistration module is specifically configured to delete context information of the terminal device that is stored on the source core network control plane device.

According to a seventh aspect, this application provides a terminal device, configured to perform the core network control plane device selection method in the second aspect, and including:

a receiving module, configured to receive first network slice selection assistance information and first indication information from a source core network control plane device, where the first network slice selection assistance information is used to index a target core network control plane device, and the first indication information is used to indicate that a temporary identifier of the terminal device is invalid; and a sending module, configured to send a first registration request message to an access network device based on the first network slice selection assistance information and the first indication information, where the first registration request message carries the first network slice selection assistance information and a permanent identifier of the terminal device.

According to an eighth aspect, this application provides a core network control plane device, serving as a source core network control plane device, configured to perform the core network control plane device selection method in the third aspect, and including:

a determining module, configured to determine whether first network slice selection assistance information can be determined, where the first network slice selection assistance information is used to index a target core network control plane device; and a sending module, configured to: if the source core network control plane device cannot determine the first network slice selection assistance information, send third network slice selection assistance information and first indication information to a terminal device, to trigger the terminal device to send a third registration request message, where the first indication information is used to indicate that a temporary identifier of the terminal device is invalid, the third network slice selection assistance information is used to index a default core network control plane device, and the third registration request message carries the third network slice selection assistance information and a permanent identifier of the terminal device.

In a possible implementation, the core network control plane device further includes:

a temporary identifier setting module, configured to set the temporary identifier of the terminal device to be invalid.

In a possible implementation, the core network control plane device further includes:

a deregistration module, configured to deregister the terminal device from the source core network control plane device.

According to a ninth aspect, this application provides a terminal device, configured to perform the core network control plane device selection method in the fourth aspect, and including:

a receiving module, configured to receive third network slice selection assistance information and first indication information from a source core network control plane device, where the third network slice selection assistance information is used to index a default core network control plane device, and the first indication information is used to indicate that a temporary identifier of the terminal device is invalid; and a sending module, configured to send a third registration request message to an access network device based on the third network slice selection assistance information and the first indication information, where the third registration request message carries the third network slice selection assistance information and a permanent identifier of the terminal device.

According to a tenth aspect, this application provides a core network control plane device, serving as a default core network control plane device, configured to perform the core network control plane device selection method in the fifth aspect, and including:

a receiving module, configured to receive a third registration request message from an access network device, where the third registration request message carries a permanent identifier of a terminal device;

a subscription data obtaining module, configured to obtain subscription data of the terminal device from a subscriber data management center device based on the permanent identifier;

a target core network control plane device obtaining module, configured to determine a target core network control plane device of the terminal device based on the subscription data; and a redirection module, configured to redirect the terminal device to the target core network control plane device.

In a possible implementation, the redirection module further includes:

a sending unit, configured to: send a first redirection indication message to the access network device, where the first redirection indication message is used to trigger the access network device to redirect the terminal device to the target core network control plane device; or send a second redirection indication message to the target core network control plane device, where the second redirection indication message is used to trigger the target core network control plane device to complete redirection of the terminal device.

This application further provides a core network control plane device, an access network device, and a terminal device that are configured to perform the core network control plane device selection methods in the first to the fifth aspects. The core network control plane device, the access network device, and the terminal device have a same technical feature and same technical effects as the core network control plane device selection methods, and details are not described in this application again.

According to an eleventh aspect, this application provides a core network control plane device, serving as a first core network control plane device, configured to perform the core network control plane device selection method in the first aspect, and including:

a processor, configured to obtain first network slice selection assistance information of a terminal device; and a transmitter, configured to: if the first core network control plane device cannot determine a second core network control plane device indexed by the first network slice selection assistance information, send, by the first core network control plane device, the first network slice selection assistance information and first indication information to the terminal device, to trigger the terminal device to send a first registration request message, where the first indication information is used to indicate that a temporary identifier of the terminal device is invalid, and the first registration request message carries the first network slice selection assistance information and a permanent identifier of the terminal device.

In a possible implementation, the processor is further configured to set the temporary identifier of the terminal device to be invalid.

In a possible implementation, the processor is specifically configured to:

obtain subscription data of the terminal device from a subscriber data management center device; and determine the first network slice selection assistance information based on the subscription data.

In a possible implementation, the processor is specifically configured to obtain subscription data of the terminal device from a subscriber data management center device;

the transmitter is further configured to send the subscription data to a third core network control plane device, to request the first network slice selection assistance information of the terminal device; and the first core network control plane device further includes a receiver, where the receiver is configured to receive the first network slice selection assistance information from the third core network control plane device.

In a possible implementation, the processor is specifically configured to:

determine, based on the first network slice selection assistance information, that the first core network control plane device cannot continue to serve the terminal device.

In a possible implementation, the receiver is further configured to:

receive a second registration request message from the terminal device, where the second registration request message carries second network slice selection assistance information, and the second network slice selection assistance information is used to index the first core network control plane device.

In a possible implementation, the processor is further configured to:

when it is determined that a slice type or a service type associated with the first network slice selection assistance information is not included in a slice type or a service type associated with the second network slice selection assistance information, determine that the first core network control plane device cannot continue to serve the terminal device.

In a possible implementation, the transmitter is further configured to:

send the first network slice selection assistance information to a third core network control plane device, to request the second core network control plane device indexed by the first network slice selection assistance information; and the processor is further configured to: if the request fails, determine that the first core network control plane device cannot determine the second core network control plane device indexed by the first network slice selection assistance information.

In a possible implementation, the processor is further configured to:

deregister the terminal device from the first core network control plane device.

In a possible implementation, the processor is specifically configured to delete context information of the terminal device that is stored on the first core network control plane device.

According to a twelfth aspect, this application provides a terminal device, configured to perform the core network control plane device selection method in the second aspect, and including:

a receiver, configured to receive first network slice selection assistance information and first indication information from a first core network control plane device, where the first network slice selection assistance information is used to index a second core network control plane device, and the first indication information is used to indicate that a temporary identifier of the terminal device is invalid; and a transmitter, configured to send a first registration request message to an access network device based on the first network slice selection assistance information and the first indication information, where the first registration request message carries the first network slice selection assistance information and a permanent identifier of the terminal device.

According to a thirteenth aspect, this application provides a core network control plane device, serving as a fourth core network control plane device, configured to perform the core network control plane device selection method in the third aspect, and including:

a processor, configured to determine whether first network slice selection assistance information can be determined, where the first network slice selection assistance information is used to index a fifth core network control plane device; and a transmitter, configured to: if the fourth core network control plane device cannot determine the first network slice selection assistance information, send third network slice selection assistance information and first indication information to a terminal device, to trigger the terminal device to send a third registration request message, where the first indication information is used to indicate that a temporary identifier of the terminal device is invalid, the third network slice selection assistance information is used to index a sixth core network control plane device, and the third registration request message carries the third network slice selection assistance information and a permanent identifier of the terminal device.

In a possible implementation, the processor is further configured to:

set the temporary identifier of the terminal device to be invalid.

In a possible implementation, the processor is further configured to deregister the terminal device from the fourth core network control plane device.

According to a fourteenth aspect, this application provides a terminal device, configured to perform the core network control plane device selection method in the fourth aspect, and including:

a receiver, configured to receive third network slice selection assistance information and first indication information from a fourth core network control plane device, where the third network slice selection assistance information is used to index a sixth core network control plane device, and the first indication information is used to indicate that a temporary identifier of the terminal device is invalid; and a transmitter, configured to send a third registration request message to an access network device based on the third network slice selection assistance information and the first indication information, where the third registration request message carries the third network slice selection assistance information and a permanent identifier of the terminal device.

According to a fifteenth aspect, this application provides a core network control plane device, serving as a sixth core network control plane device, configured to perform the core network control plane device selection method in the fifth aspect, and including:

a receiver, configured to receive a third registration request message from an access network device, where the third registration request message carries a permanent identifier of a terminal device; and a processor, configured to obtain subscription data of the terminal device from a subscriber data management center device based on the permanent identifier, where the processor is further configured to determine a fifth core network control plane device of the terminal device based on the subscription data; and the processor is further configured to redirect the terminal device to the fifth core network control plane device.

In a possible implementation, the core network control plane device further includes:

a transmitter, configured to: send a first redirection indication message to the access network device, where the first redirection indication message is used to trigger the access network device to redirect the terminal device to the fifth core network control plane device; or send a second redirection indication message to the fifth core network control plane device, where the second redirection indication message is used to trigger the fifth core network control plane device to complete redirection of the terminal device.

According to a sixteenth aspect, an embodiment of this application provides a program. The program is configured to perform the method in the first aspect when executed by a processor.

According to a seventeenth aspect, an embodiment of this application provides a program product, for example, a computer-readable storage medium, including the program in the sixteenth aspect.

According to an eighteenth aspect, an embodiment of this application provides a computer-readable storage medium. The computer-readable storage medium stores an instruction. When the instruction is run on a computer, the instruction causes the computer to perform the method in the first aspect.

According to a nineteenth aspect, an embodiment of this application provides a program. The program is configured to perform the method in the second aspect when executed by a processor.

According to a twentieth aspect, an embodiment of this application provides a program product, for example, a computer-readable storage medium, including the program in the nineteenth aspect.

According to a twenty-first aspect, an embodiment of this application provides a computer-readable storage medium. The computer-readable storage medium stores an instruction. When the instruction is run on a computer, the instruction causes the computer to perform the method in the second aspect.

According to a twenty-second aspect, an embodiment of this application provides a program. The program is configured to perform the method in the third aspect when executed by a processor.

According to a twenty-third aspect, an embodiment of this application provides a program product, for example, a computer-readable storage medium, including the program in the twenty-second aspect.

According to a twenty-fourth aspect, an embodiment of this application provides a computer-readable storage medium. The computer-readable storage medium stores an instruction. When the instruction is run on a computer, the instruction causes the computer to perform the method in the third aspect.

According to a twenty-fifth aspect, an embodiment of this application provides a program. The program is configured to perform the method in the fourth aspect when executed by a processor.

According to a twenty-sixth aspect, an embodiment of this application provides a program product, for example, a computer-readable storage medium, including the program in the twenty-fifth aspect.

According to a twenty-seventh aspect, an embodiment of this application provides a computer-readable storage medium. The computer-readable storage medium stores an instruction. When the instruction is run on a computer, the instruction causes the computer to perform the method in the fourth aspect.

According to a twenty-eighth aspect, an embodiment of this application provides a program. The program is configured to perform the method in the fifth aspect when executed by a processor.

According to a twenty-ninth aspect, an embodiment of this application provides a program product, for example, a computer-readable storage medium, including the program in the twenty-eighth aspect.

According to a thirtieth aspect, an embodiment of this application provides a computer-readable storage medium. The computer-readable storage medium stores an instruction. When the instruction is run on a computer, the instruction causes the computer to perform the method in the fifth aspect.

According to a thirty-first aspect, an embodiment of this application provides a program. The program is configured to perform the method in the sixth aspect when executed by a processor.

According to a thirty-second aspect, an embodiment of this application provides a program product, for example, a computer-readable storage medium, including the program in the thirty-first aspect.

According to a thirty-third aspect, an embodiment of this application provides a computer-readable storage medium. The computer-readable storage medium stores an instruction. When the instruction is run on a computer, the instruction causes the computer to perform the method in the sixth aspect.

DESCRIPTION OF EMBODIMENTS

A network architecture and a service scenario in this application are intended to more clearly describe technical solutions of this application, and do not constitute a limitation on the technical solutions provided in this application. A person of ordinary skill in the art may learn that with evolution of the network architecture and emergence of a new service scenario, the technical solutions provided in this application are also applicable to similar technical problems.

Figure 1:
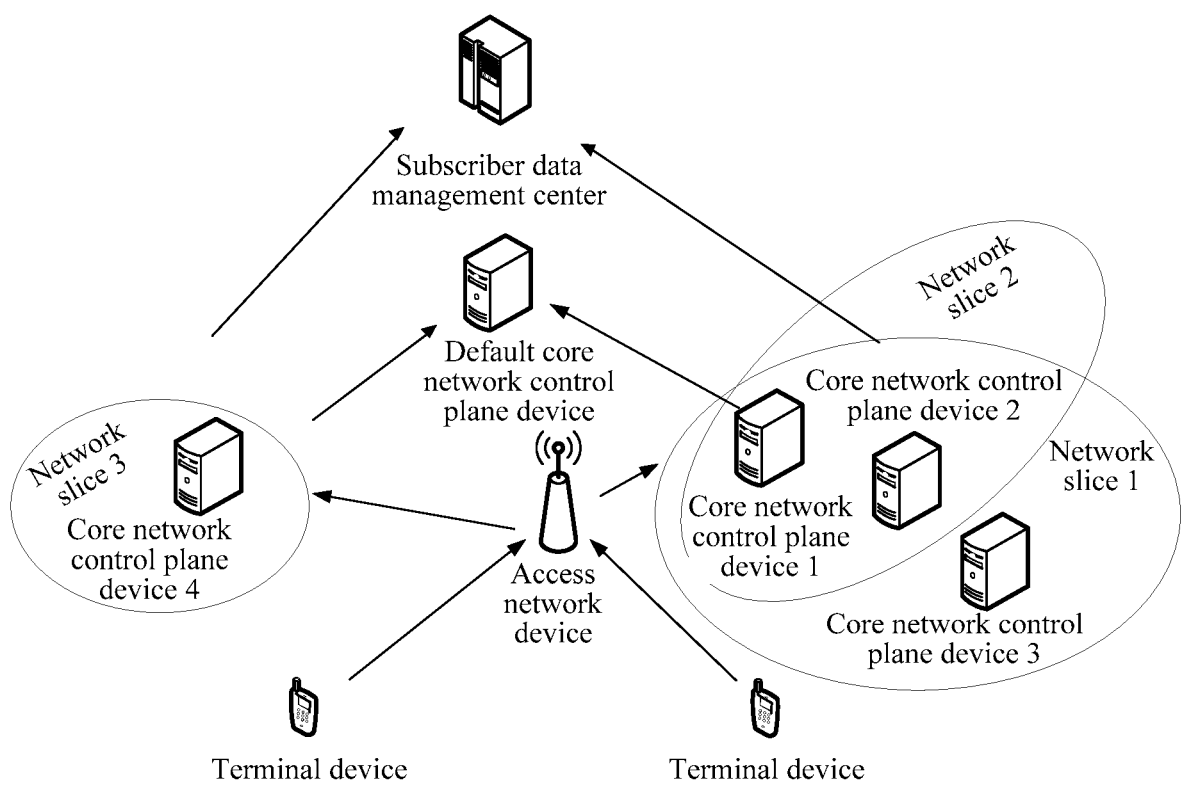
FIG. 1 shows a system architecture applicable to embodiments of this application.

System architecture applicable to embodiments of this application is described below with reference to FIG. 1. FIG. 1 shows system architecture applicable to the embodiments of this application. As shown in FIG. 1, the system architecture provided in the embodiments includes at least one terminal device, at least one access network device, at least one core network control plane device, at least one default core network control plane device, and at least one subscriber data management center device.

In a communications system, to meet different requirements of different services on network performance, a network needs to have a capability of orchestrating network functions based on a requirement and be capable of implementing network slices having different functions. There is a development tendency for the communications system to set up different network slices for different types of services by using a virtualization technology. Each network slice may be considered as an integrated network, and network slices corresponding to different types of services may use different network forms. For example, different protocol stack structures are used in a data plane or a signaling plane, to better match a service feature. Network slices are distinguished in the data plane, and share a common control plane function. A network slice includes a group of one or more network functions and a resource that can run these network functions.

When network slices are deployed in a core network and a terminal device initially accesses the network, a network slice selection process is triggered. The network slice selection process depends on subscription data of the terminal device, local configuration information, a roaming agreement, an operator policy, and the like. The terminal device may access one network slice or a plurality of network slices. The plurality of network slices may share some control plane functions, and implement a function, for example, mobility management, at a terminal granularity. When the terminal device needs to access a network slice, the terminal device may provide network slice selection assistance information (NSSAI) to the core network, so that the core network selects a network slice instance for the terminal device.

The terminal device communicates with the core network by using an access network device. The terminal device may be a wireless terminal or a wired terminal. The wireless terminal may be a device that provides a user with connectivity of voice and/or other service data, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (Subscriber Unit), a subscriber station, a mobile station, a mobile, a remote station, a remote terminal, an access terminal (Access Terminal), a user terminal (User Terminal), a user agent (User Agent), or a station (STA). This is not limited herein. FIG. 1 is a possible schematic diagram by using an example in which the terminal device is a mobile phone.

The access network device is a device for providing a network access service, and may allow the terminal device to access a wireless network by using the access network device. The terminal device communicates with the core network by using the access network device. The access network device may be a base transceiver station (BTS) in Global System for Mobile Communications (GSM) or Code Division Multiple Access (CDMA); may be a NodeB (NB) in Wideband Code Division Multiple Access (WCDMA); may be an evolved NodeB (eNB or eNodeB), a relay station, an access point (AP), or a radio access network (RAN) in Long Term Evolution (LTE); or may be a base station in a future 5G network. This is not limited herein. FIG. 1 is a possible schematic diagram by using an example in which the access network device is a base station.

The core network control plane device is a device for providing a service for the terminal device, and mainly includes a mobility management function. For example, the mobility management function includes a mobile state management function, a user temporary identifier allocation function, and a user authentication and authorization function. One core network control plane device is associated with one or more network slices, in other words, a plurality of network slices share one core network control plane device. The terminal device registers with a particular core network control plane device to access a particular network slice. The core network control plane device may be an access and mobility management function (AMF) device.

The subscriber data management center device is configured to store the subscription data of the terminal device. For example, the subscription data of the terminal device includes subscription data related to mobility management and subscription data related to session management. When the subscription data of the terminal device changes, the subscriber data management center device may send changed subscription data to a core network control plane device with which the terminal device currently registers.

The default core network control plane device is a core network control plane device that can communicate with any core network control plane device, and the default core network control plane device does not need to be isolated from any core network control plane device for security, in other words, the default core network control plane device can communicate with any core network control plane device.

With reference to FIG. 1, a core network control plane device selection method provided in the embodiments of this application may be applied to the following scenario: When a service that needs to be performed by a terminal device is updated from a service of a first type to a service of a second type, performance of a network slice 1 originally accessed by the terminal device cannot meet a requirement of the service of the second type, and the terminal device needs to be redirected to a network slice 3, to be specific, the terminal device needs to be redirected to a core network control plane device 4 in the network slice 3. In a redirection process of the terminal device, a source management device (for example, a core network control plane device 1) stores context information of the terminal device. Therefore, a new management device (for example, the core network control plane device 4) may request the source management device for a context of the terminal device. However, when a source network slice cannot determine a target network slice, the source network slice and a new network slice may need to be isolated from each other. If the terminal device still uses the foregoing redirection method, the new management device may access the source management device to obtain the context of the terminal device, affecting isolation between the source network slice and the new network slice, and reducing security of the network slice.

In the redirection process initiated by the terminal device, the terminal device may send a registration request message carrying a temporary identifier of the terminal device. A target core network control plane device determines, based on the temporary identifier of the terminal device, an identifier of a source core network control plane device allocating the temporary identifier, and sends the temporary identifier of the terminal device to the source core network control plane device, to request the stored context information of the terminal device from the source core network control plane device. However, when the source core network control plane device cannot determine the target core network control plane device, the target core network control plane device and the source core network control plane device may need to be isolated from each other, and consequently the target core network control plane device and the source core network control plane device cannot communicate with each other. In this case, the target core network control plane device may fail to request the context information of the terminal device from the source core network control plane device, and therefore redirection of the terminal device is affected. The terminal device needs to re-initiate a registration request message carrying a permanent identifier of the terminal device, so that the target core network control plane device requests subscription data of the terminal device from a subscriber data management center to complete the redirection. Therefore, when the source core network control plane device cannot determine the target core network control plane device due to the requirement of isolation between the source core network control plane device and the target core network control plane device, the foregoing redirection method further has problems of complex redirection steps and relatively large signaling overheads.

To resolve the foregoing problems, a first aspect of this application provides a core network control plane device selection method, to resolve a problem of redirection of a terminal device when a source core network control plane device cannot determine a target core network control plane device. The core network control plane device selection method provided in this application is described below in detail by using detailed embodiments. The following several specific embodiments may be combined with each other, and same or similar concepts or processes may not be repeatedly described in some embodiments.

Figure 2:
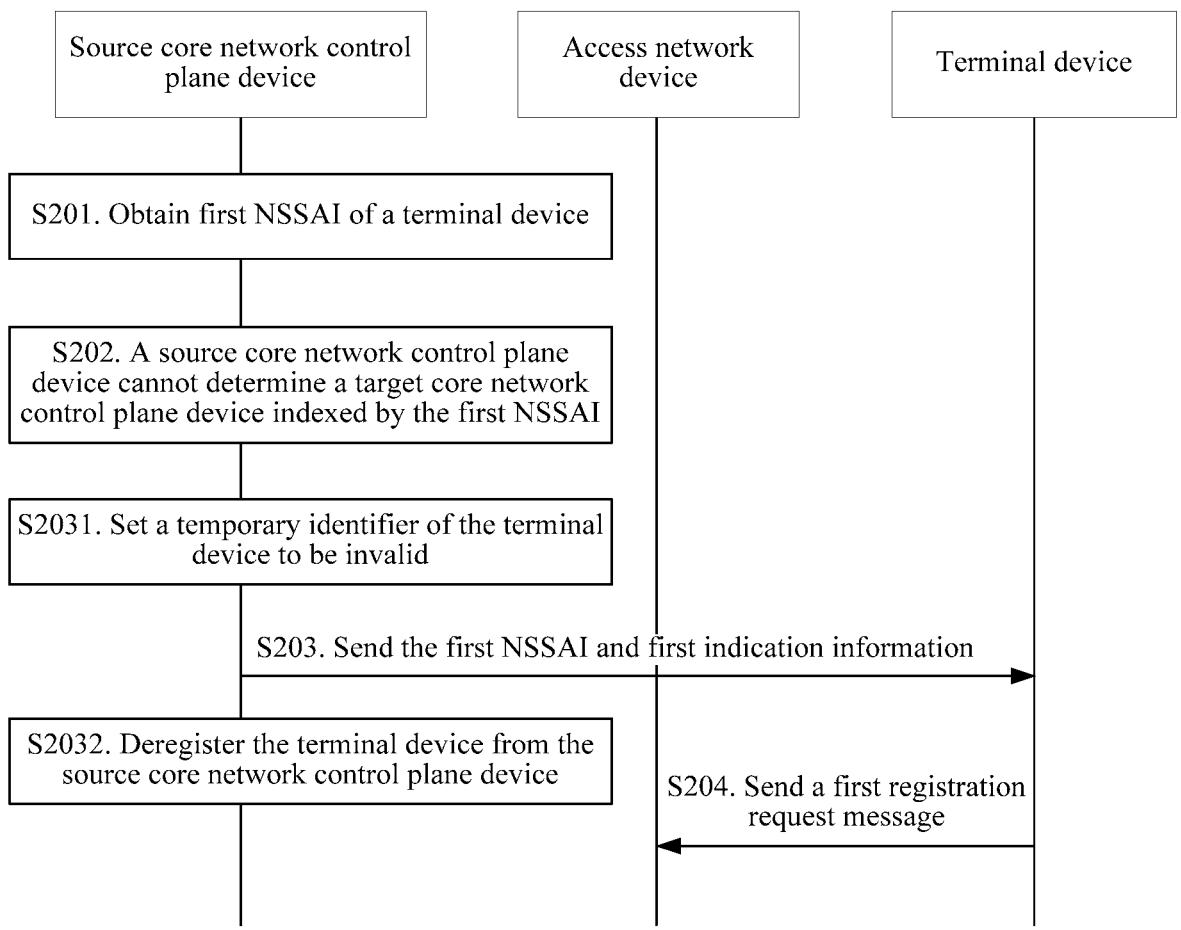
FIG. 2 is a diagram of signaling interaction in a core network control plane device selection method according to an embodiment of this application.

FIG. 2 is a diagram of signaling interaction in a core network control plane device selection method according to an embodiment of this application. As shown in FIG. 2, the core network control plane device selection method provided in this embodiment of this application includes the following steps.

S201: A source core network control plane device obtains first NSSAI of a terminal device.

For example, the source core network control plane device in this embodiment of this application is a core network control plane device with which the terminal device currently registers, and a network slice currently accessed by the terminal device is a source network slice. When subscription data of the terminal device changes, the source core network control plane device obtains the first NSSAI of the terminal device based on the subscription data.

The subscription data includes authentication information, information about a subscribed service access point name, information about a service level corresponding to the access point name, access restriction data information, roaming restriction information, and the like. For example, that the subscription data changes may be that any one of the subscription data changes. When the subscription data of the terminal device changes, it indicates that the terminal device raises a new network performance requirement. Therefore, the source network slice may not meet the new requirement of the terminal device, and an appropriate network slice needs to be reselected for the terminal device.

NSSAI may be used to assist a core network to select an appropriate network slice for the terminal device. For example, the NSSAI may be a preset standard value or a particular value in a public land mobile network (PLMN). Alternatively, the NSSAI may be a set of session management-network slice selection assistance information (SM-NSSAI).

When subscription information of the terminal device changes, the source core network control plane device may determine NSSAI corresponding to new subscription information of the terminal device, determine a target network slice type based on the NSSAI, and further determine, for the terminal device, a target core network control plane device associated with the target network slice type.

Alternatively, new subscription information of the terminal device includes the first NSSAI, and the source core network control plane device directly obtains the first NSSAI from the new subscription information.

S202: The source core network control plane device cannot determine a target core network control plane device indexed by the first NSSAI.

For example, different network slices have different security level requirements. To ensure security of data in a network slice having a high security level requirement, the network slice and another network slice need to be isolated from each other, in other words, devices included in the two network slices cannot communicate with each other. When there is security isolation between two network slices, there is no shared core network control plane device between the two network slices. In addition, core network control plane devices inside the two network slices cannot communicate with each other.

To avoid interaction between network slices having an isolation requirement, in this application, before triggering the terminal device to initiate a redirection procedure, the source core network control plane device needs to determine, based on the first NSSAI, the target core network control plane device indexed by the first NSSAI. As described above, if there is security isolation between a source network slice and a target network slice, the source core network control plane device cannot determine the target core network control plane device indexed by the first NSSAI.

S203: The source core network control plane device sends the first NSSAI and first indication information to the terminal device.

The first indication information is used to indicate that a temporary identifier of the terminal device is invalid. Optionally, referring to FIG. 2, the source core network control plane device may send the first NSSAI and the first indication information to the terminal device by using an access network device. Signaling interaction between a source core network control plane device and a terminal device in each of the following embodiments may be implemented by using an access network device, and details are not described in this application again.

Optionally, before S203, this embodiment of this application further includes the following step:

S2031: The source core network control plane device sets a temporary identifier of the terminal device to be invalid.

For example, when the source core network control plane device cannot determine the target core network control plane device indexed by the first NSSAI, the source core network control plane device sets the temporary identifier of the terminal device to be invalid. Because the temporary identifier of the terminal device is set to be invalid, when the terminal device subsequently initiates a registration request message, the registration request message no longer carries the temporary identifier of the terminal device. Therefore, the target core network control plane device does not need to obtain an address of the source core network control plane device based on the temporary identifier or access the source core network control plane device to obtain a context of the terminal device, thereby improving security isolation of a network slice.

Optionally, after S203, this embodiment of this application further includes the following step:

S2032: The source core network control plane device deregisters the terminal device from the source core network control plane device. For example, the source core network control plane device deletes context information of the terminal device that is stored on the source core network control plane device, to deregister the terminal device from the source core network control plane device.

For example, after sending the first NSSAI and the first indication information to the terminal device, the source core network control plane device deregisters the terminal device from the source core network control plane device, so that the source core network control plane device no longer provides a service for the terminal device. The source core network control plane device no longer stores the context information of the terminal device. Therefore, the terminal device or any core network control plane device cannot request the context information of the terminal device from the source core network control plane device, thereby avoiding service interaction, and improving security.

S204: The terminal device sends a first registration request message to an access network device based on the first NSSAI and the first indication information, where the first registration request message carries the first NSSAI and a permanent identifier of the terminal device.

For example, the source core network control plane device sends the first NSSAI and the first indication information to the terminal device. The first NSSAI is used to index the target core network control plane device, and the first indication information is used to indicate that the temporary identifier of the terminal device is invalid. The first NSSAI and the first indication information are used to trigger the terminal device to initiate a registration request procedure. The terminal device sends the first registration request message to the access network device. The first registration request message carries the permanent identifier of the terminal device. For example, the terminal device sends, by using the access network device, the first registration request message to the target core network control plane device indicated by the first NSSAI, to redirect the terminal device to the target core network control plane device.

For example, after receiving the first NSSAI and the first indication information, the terminal device learns that the temporary identifier of the terminal device has already been invalid and sends the first registration request message to the access network device based on the first NSSAI. For example, the terminal device may send the first registration request message in the following manner:

When sending the first registration request message to the access network device, the terminal device may also send a Radio Resource Control (RRC) message between the terminal device and the access network device. The RRC message carries the first NSSAI and a PLMN selected by the terminal device. The access network device determines the target core network control plane device of the terminal device based on the first NSSAI and the PLMN selected by the terminal device that are in the RRC message, and forwards the first registration request message to the target core network control plane device. After receiving the first registration request message, the target core network control plane device requests subscription data of the terminal device from a subscriber data management center device based on the permanent identifier of the terminal device, and completes a registration procedure of the terminal device on the target core network control plane device based on the subscription data.

The first registration request message may be a non-access stratum (NAS) message, and the NAS message carries the permanent identifier of the terminal device and the first NSSAI. For example, the permanent identifier of the terminal device may be an international mobile subscriber identity (IMSI), or may be a subscriber permanent identifier (SUPI).

In the core network control plane device selection method provided in this embodiment of this application, when the source core network control plane device receives the first NSSAI indicating the target core network control plane device, if the source core network control plane device cannot determine the target core network control plane device indexed by the first NSSAI, the source core network control plane device learns that the source core network control plane device and the target core network control plane device need to be isolated from each other and sends the first NSSAI and the first indication information to the terminal device. After learning, based on the first indication information, that the temporary identifier of the terminal device is set to be invalid, the terminal device sends the registration request message carrying the first NSSAI and the permanent identifier of the terminal device to the access network device, so that information exchange is avoided between the source core network control plane device and the target core network control plane device, security between network slices is improved, procedure efficiency of redirecting the terminal device to the target core network control plane device is improved, and signaling is saved.

In addition, the source core network control plane device sets the temporary identifier of the terminal device to be invalid, and deregisters the terminal device from the source core network control plane device, so that the source core network control plane device no longer provides a service for the terminal device, and the terminal device does not need to perform service interaction with the source core network control plane device again, thereby improving the security of the network slices.

In conclusion, according to the core network control plane device selection method provided in this application, security of the network slices and redirection efficiency of the terminal device are improved, and signaling is saved.

Figure 3:
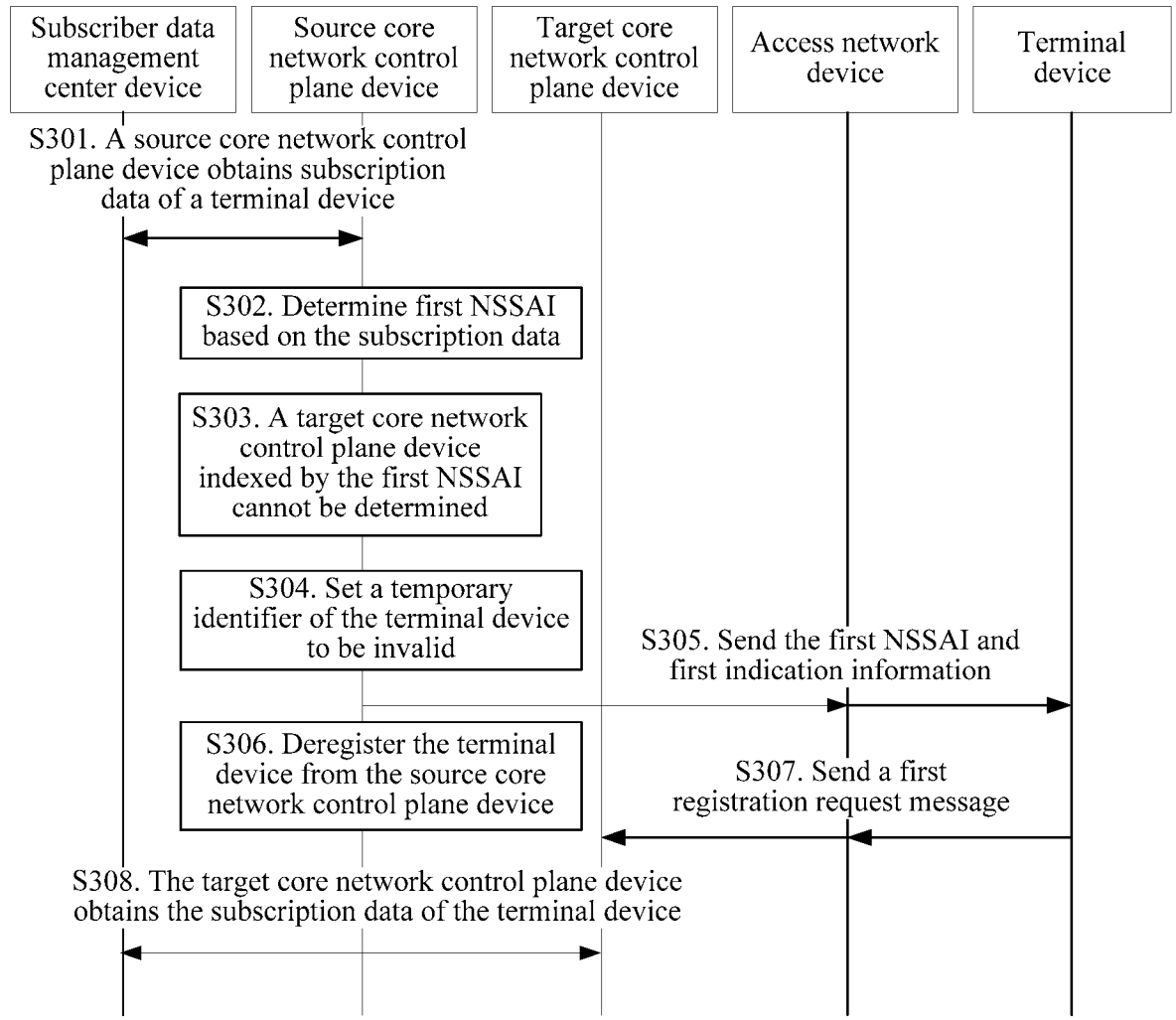
FIG. 3 is a diagram of signaling interaction in a core network control plane device selection method according to an embodiment of this application.
Figure 4:
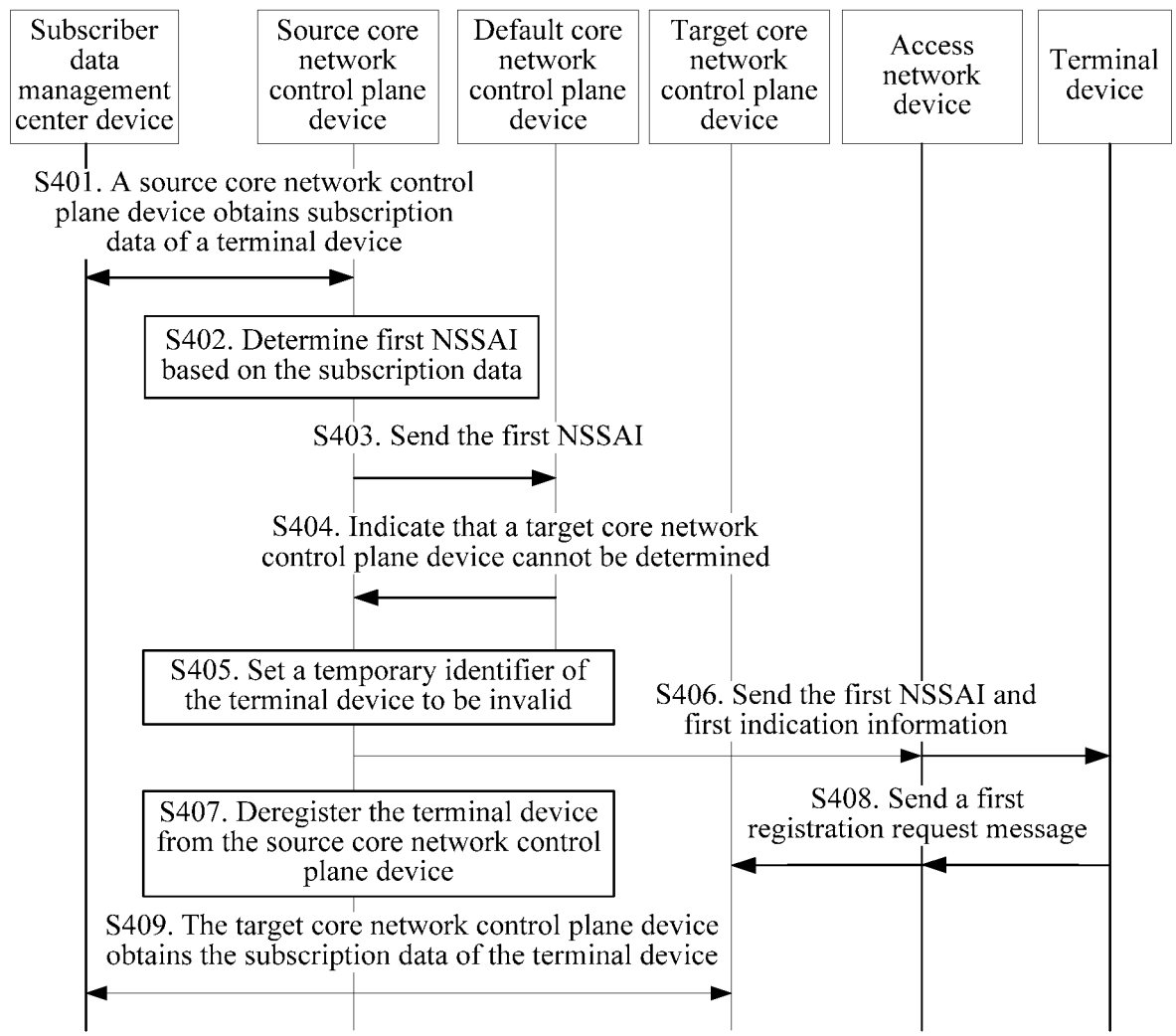
FIG. 4 is a diagram of signaling interaction in a core network control plane device selection method according to an embodiment of this application.

Further, based on the embodiment shown in FIG. 2, further description is provided in FIG. 3 and FIG. 4 based on two possible implementations in which the source core network control plane device cannot determine the target core network control plane device indexed by the first NSSAI. FIG. 3 and FIG. 4 are diagrams of signaling interaction in a core network control plane device selection method according to embodiments of this application.

Referring to FIG. 3, the core network control plane device selection method provided in this embodiment of this application includes the following steps.

S301: A source core network control plane device obtains subscription data of a terminal device from a subscriber data management center device.

For example, the source core network control plane device receives the subscription data of the terminal device from the subscriber data management center device. After finding a change in the subscription data of the terminal device that is stored on the subscriber data management center device, the subscriber data management center device determines, based on a permanent identifier of the terminal device, the source core network control plane device with which the terminal device currently registers. Then, the subscriber data management center device sends new subscription data of the terminal device and the permanent identifier of the terminal device to the source core network control plane device.

Optionally, the subscriber data management center device may send the subscription data in the following manner:

The subscriber data management center device sends the new subscription data of the terminal device to the source core network control plane device by using an insert subscription data request message. When receiving the new subscription data of the terminal device and the permanent identifier of the terminal device, the source core network control plane device may determine a specific terminal device that is registered with the source core network control plane device and whose subscription data changes.

Optionally, after receiving the new subscription data of the terminal device, the source core network control plane device may further send an insert subscription data answer message to the subscriber data management center device.

S302: The source core network control plane device determines first NSSAI based on the subscription data.

For example, when receiving the new subscription data of the terminal device, the source core network control plane device compares the new subscription data of the terminal device with the old subscription data of the terminal device, and determines whether an item that changes in the subscription data causes the NSSAI to change. If the item causes the NSSAI to change, the source core network control plane device obtains the first NSSAI based on the item that changes in the subscription data. In an optional implementation, the source core network control plane device may configure a correspondence between subscription data and NSSAI, and determine the NSSAI by using the subscription data.

Alternatively, when the source core network control plane device receives the new subscription data of the terminal device, the new subscription data includes the first NSSAI, and the source core network control plane device may directly obtain the first NSSAI. If the item that changes in the subscription data does not cause the NSSAI to change, the terminal device does not need to perform redirection registration with a core network control plane device.

S303: The source core network control plane device cannot determine a target core network control plane device indexed by the first NSSAI.

For example, when the source core network control plane device and the target core network control plane device indexed by the first NSSAI need to be isolated from each other, the source core network control plane device cannot determine the target core network control plane device indexed by the first NSSAI.

If a source network slice and a target network slice do not need to be isolated from each other for security, the source core network control plane device and the target core network control plane device can communicate with each other, and the terminal device may send a registration request message or a tracking area update (TAU) request message that carries the first NSSAI and a temporary identifier of the terminal device to an access network device. The target core network control plane device may request context information of the terminal device from the source core network control plane device based on the temporary identifier of the terminal device, to complete a registration procedure or a TAU procedure.

Further, before the source core network control plane device obtains the first NSSAI of the terminal device and determines the target core network control plane device based on the first NSSAI, the core network control plane device selection method provided in this embodiment of this application further includes: receiving, by the source core network control plane device, a second registration request message from the terminal device, where the second registration request message carries second NSSAI, and the second NSSAI is used to index the source core network control plane device.

For example, before the terminal device accesses a PLMN, configured NSSAI, namely, the second NSSAI, is preset on the terminal device. The configured NSSAI is used to indicate an available network slice of the terminal device in a selected PLMN. When initially accessing a network slice, the terminal device sends an initial registration request to the access network device. The initial registration request carries the configured NSSAI. The access network device sends, based on the configured NSSAI, the permanent identifier of the terminal device in the initial registration request to a core network control plane device corresponding to the configured NSSAI, namely, the source core network control plane device, to complete initial registration of the terminal device.

Optionally, before determining that the target core network control plane device indexed by the first NSSAI cannot be determined, the source core network control plane device further needs to determine whether the source core network control plane device can continue to serve the terminal device.

For example, whether the source core network control plane device can continue to serve the terminal device is determined in the following manner:

If the source core network control plane device determines the first NSSAI based on the latest subscription data, and determines that a slice type or a service type associated with the first NSSAI is not included in a slice type or a service type associated with the source core network control plane device, it indicates that the terminal device cannot access, by using the source core network control plane device, the target network slice indicated by the first NSSAI, and it is determined that the source core network control plane device cannot continue to serve the terminal device. If determining that the source core network control plane device cannot continue to serve the terminal device, the source core network control plane device further determines whether the source network slice can determine the target core network control plane device indexed by the first NSSAI. If the source core network control plane device determines that the source core network control plane device can continue to serve the terminal device, the terminal device does not need to perform redirection registration with a core network control plane device, and can still register with the source core network control plane device and access the target network slice by using the source core network control plane device.

For example, if compared with the old subscription data, the new subscription data of the terminal device indicates a network slice of a same slice type, the terminal device may be served by a same core network control plane device. If a slice type associated with the second NSSAI of the terminal device includes 1, 2, and 3, when the slice type associated with the first NSSAI of the terminal device includes 1 and/or 2, it is considered that the source core network control plane device may continue to serve the terminal device. When the slice type associated with the first NSSAI of the terminal device includes 4, it is considered that the source core network control plane device cannot continue to serve the terminal device.

S304: The source core network control plane device sets a temporary identifier of the terminal device to be invalid.

For example, when the source core network control plane device determines that the source core network control plane device cannot continue to serve the terminal device, and the source core network control plane device cannot determine the target core network control plane device indexed by the first NSSAI, the source core network control plane device sets the temporary identifier of the terminal device to be invalid.

For example, a manner of setting, by the source core network control plane device, the temporary identifier of the terminal device to be invalid may be specifically: setting an invalid temporary identifier for the terminal device; or deleting the temporary identifier of the terminal device from a service list of the source core network control plane device.

S305: The source core network control plane device sends the first NSSAI and first indication information to the terminal device. The first indication information is used to indicate that the temporary identifier of the terminal device is invalid.

For example, the source core network control plane device may send the first NSSAI and the first indication information to the terminal device in the following manners:

Manner One: If the terminal device is in a connected state, the source core network control plane device delivers the first NSSAI and the first indication information to the terminal device by reallocating the temporary identifier of the terminal device.

Manner Two: If the terminal device is in an idle state, the source core network control plane device may wait until the terminal device initiates a TAU procedure/service request procedure to complete registration with the source core network control plane device, and then the source core network control plane device delivers the first NSSAI and the first indication information to the terminal device by using a TAU accept message/service request complete message.

Manner Three: If the terminal device is in an idle state, the source core network control plane device may page the terminal device, trigger the terminal device to initiate a service request and change from the idle state to a connected state, and send the first NSSAI and the first indication information to the terminal device in the first manner.

Optionally, the source core network control plane device may send the first NSSAI and the first indication information to the terminal device in another feasible manner. The foregoing plurality of possible implementations may be determined by the source core network control plane device according to a network policy. This is not limited in this application.

S306: The source core network control plane device deregisters the terminal device from the source core network control plane device.

For example, the source core network control plane device deletes context information of the terminal device from the source core network control plane device.

S307: The terminal device sends a first registration request message to an access network device based on the first NSSAI and the first indication information, and the access network device sends the first registration request message to the target core network control plane device, where the first registration request message carries the first NSSAI and a permanent identifier of the terminal device.

For example, the terminal device adds the permanent identifier of the terminal device and the first NSSAI to a NAS message, and an RRC message carries the first NSSAI and a PLMN selected by the terminal device. After receiving the RRC message, the access network device selects the target core network control plane device for the terminal device based on the first NSSAI and the PLMN that are carried in the RRC message. The access network device forwards the NAS message sent by the terminal device to the target core network control plane device.

S308: The target core network control plane device obtains the subscription data of the terminal device from the subscriber data management center device based on the permanent identifier of the terminal device.

For example, the target core network control plane device continues to complete a registration procedure of the terminal device based on the subscription data of the terminal device. A registration procedure in an LTE system or a 5G system may be used for the registration procedure of the terminal device. This is not described in this application in detail.

In this embodiment, when detecting that the subscription data of the terminal device changes, the subscriber data management center device sends the new subscription data of the terminal device to the source core network control plane device, so that the source core network control plane device obtains, based on the new subscription data, the first NSSAI used to index the target core network control plane device. In addition, the source core network control plane device may send, based on different processing of the terminal device in the connected state and the idle state, the first NSSAI and the first indication information to the terminal device in different manners, thereby improving flexibility of signaling interaction.

In this embodiment, depending on whether the slice type or the service type associated with the first NSSAI is included in the slice type or the service type associated with the source core network control plane device, it may be further determined whether the source core network control plane device can continue to serve the terminal device, so that redirection of the terminal device can be avoided when the source core network control plane device can continue to serve the terminal device, thereby reducing signaling overheads.

FIG. 4 is a diagram of signaling interaction in a core network control plane device selection method according to an embodiment of this application.

Referring to FIG. 4, the core network control plane device selection method provided in this embodiment of this application includes the following steps.

S401: A source core network control plane device obtains subscription data of a terminal device from a subscriber data management center device.

S402: The source core network control plane device determines first NSSAI based on the subscription data.

S403: The source core network control plane device sends the first NSSAI to a default core network control plane device, to request a target core network control plane device indexed by the first NSSAI.

S404: The default core network control plane device indicates to the source core network control plane device that the target core network control plane device indexed by the first NSSAI cannot be determined.

For example, the default core network control plane device sends second indication information to the source core network control plane device, and the second indication information is used to indicate that the target core network control plane device indexed by the first NSSAI cannot be determined. Alternatively, the default core network control plane device sends a request failure message to the source core network control plane device, or rejects to send a message to the source core network control plane device, so as to notify the source core network control plane device that the target core network control plane device indexed by the first NSSAI cannot be determined. For example, because isolation is required between a slice in which the source core network control plane device is located and a slice in which the target core network control plane device is located, the target core network control plane device indexed by the first NSSAI cannot be determined.

In other words, if the request fails, the source core network control plane device cannot determine the target core network control plane device indexed by the first NSSAI.

For example, when the source core network control plane device may determine the first NSSAI based on the subscription data, but cannot determine, based on the first NSSAI, whether the source core network control plane device and the target core network control plane device can communicate with each other, the source core network control plane device learns, by using step S404, that the target core network control plane device cannot be determined.

Optionally, similar to the embodiment shown in FIG. 3, before determining that the target core network control plane device indexed by the first NSSAI cannot be determined, the source core network control plane device further needs to determine whether the source core network control plane device can continue to serve the terminal device. For example, whether the source core network control plane device can continue to serve the terminal device is determined in the following manner:

If the source core network control plane device determines the first NSSAI based on the latest subscription data, and determines that a slice type or a service type associated with the first NSSAI is not included in a slice type or a service type associated with the source core network control plane device, it indicates that the terminal device cannot access, by using the source core network control plane device, a target network slice indicated by the first NSSAI, and it is determined that the source core network control plane device cannot continue to serve the terminal device. If determining that the source core network control plane device cannot continue to serve the terminal device, the source core network control plane device determines whether a source network slice and the target network slice need to be isolated from each other. If the source core network control plane device determines that the source core network control plane device can continue to serve the terminal device, the terminal device does not need to perform redirection registration with a core network control plane device, and can still register with the source core network control plane device and access the target network slice by using the source core network control plane device.

S405: The source core network control plane device sets a temporary identifier of the terminal device to be invalid.

S406: The source core network control plane device sends the first NSSAI and first indication information to the terminal device. The first indication information is used to indicate that the temporary identifier of the terminal device is invalid.

S407: The source core network control plane device deregisters the terminal device from the source core network control plane device.

S408: The terminal device sends a first registration request message to an access network device based on the first NSSAI and the first indication information, and the access network device sends the first registration request message to the target core network control plane device, where the first registration request message carries the first NSSAI and a permanent identifier of the terminal device.

S409: The target core network control plane device obtains the subscription data of the terminal device from the subscriber data management center device based on the permanent identifier of the terminal device.

For steps S401 to S403 and S405 to S409, refer to the descriptions of S301, S302, and S304 to S308 in FIG. 3. Details are not described herein again.

In this embodiment, the source core network control plane device sends the first NSSAI to the default core network control plane device, so that the default core network control plane device obtains, based on the subscription data, the first NSSAI and the target core network control plane device indexed by the first NSSAI. The default core network control plane device returns, to the source core network control plane device, a determining result that the target core network control plane device cannot be determined, so that the source core network control plane device triggers a subsequent operation, thereby resolving a problem of unsuccessful redirection of the terminal device.

A second aspect of this application further provides a core network control plane device selection method. A difference from any embodiment in the foregoing first aspect is that, when a source core network control plane device cannot determine first NSSAI, in this embodiment, the source core network control plane device first redirects a terminal device to a default core network control plane device, and then the default core network control plane device serves the terminal device and redirects the terminal device to a target core network control plane device. The core network control plane device selection method provided in this application is described below in detail by using a detailed embodiment.

Figure 5:
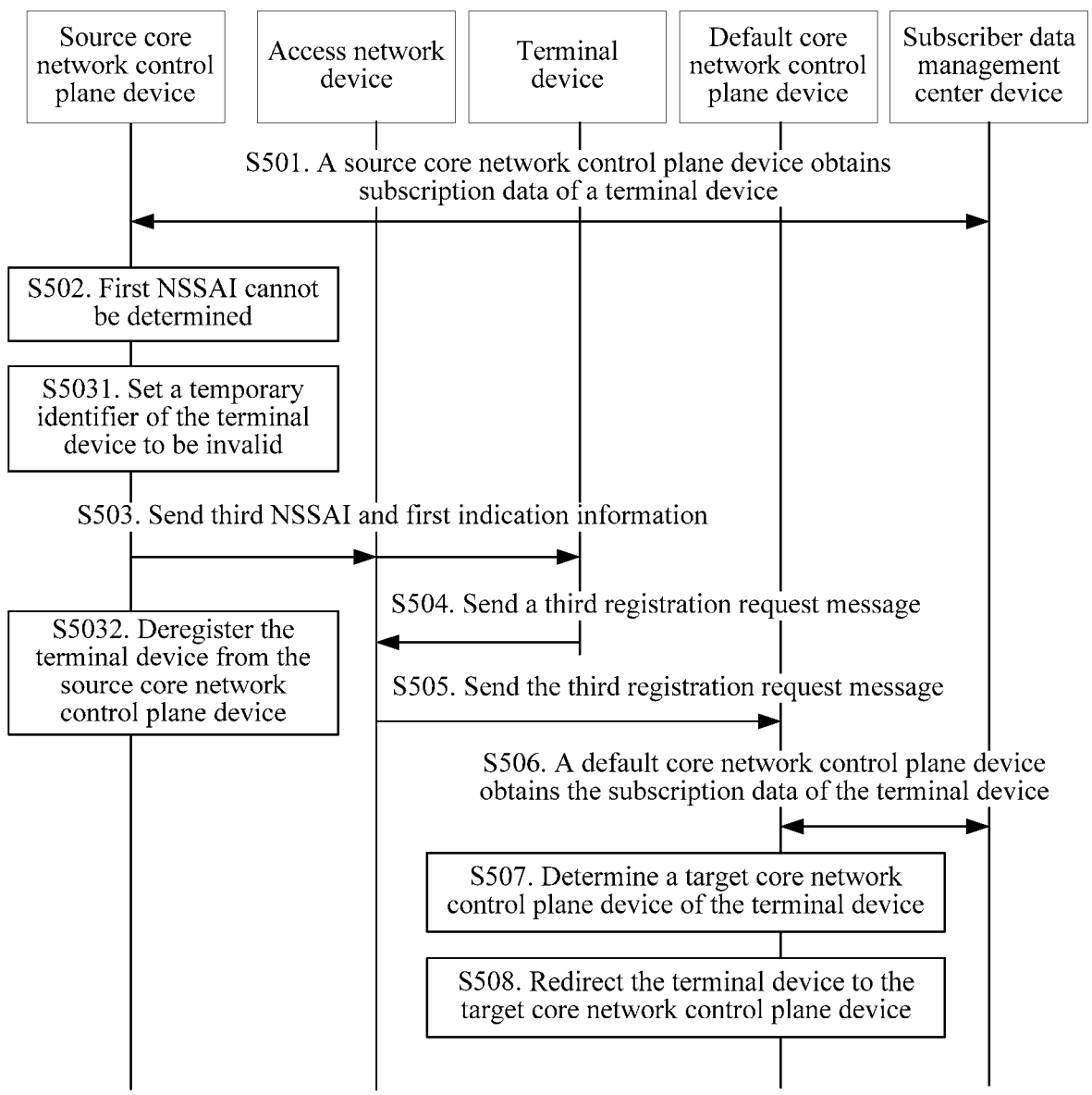
FIG. 5 is a diagram of signaling interaction in a core network control plane device selection method according to an embodiment of this application.

FIG. 5 is a diagram of signaling interaction in a core network control plane device selection method according to an embodiment of this application. Referring to FIG. 5, the core network control plane device selection method provided in this embodiment of this application includes the following steps.

S501: A source core network control plane device obtains subscription data of a terminal device from a subscriber data management center device.

A manner of obtaining the subscription data of the terminal device may be similar to the method described in any of the foregoing embodiments, and details are not described herein again.

S502: The source core network control plane device determines that first NSSAI cannot be determined, where the first NSSAI is used to index a target core network control plane device.

For example, when obtaining the subscription data of the terminal device, the source core network control plane device determines whether the first NSSAI of the terminal device can be determined. When determining that the first NSSAI of the terminal device can be determined, the source core network control plane device may perform the embodiment shown in any one of FIG. 2 to FIG. 4.

That the source core network control plane device determines that the first NSSAI of the terminal device cannot be determined may be that the source core network control plane device itself cannot determine the first NSSAI of the terminal device based on the subscription data of the terminal device, or may be that the source core network control plane device cannot obtain the first NSSAI of the terminal device from a default core network control plane device.

S503: The source core network control plane device sends third NSSAI and first indication information to the terminal device, where the first indication information is used to indicate that a temporary identifier of the terminal device is invalid, and the third NSSAI is used to index the default core network control plane device.

For example, when determining that the first NSSAI cannot be determined, the source core network control plane device sends the third NSSAI and the first indication information to the terminal device. When receiving the first indication information, the terminal device determines that the temporary identifier allocated by the source core network control plane device to the terminal device is invalid. The terminal device performs redirection registration with the default core network control plane device based on the third NSSAI.

For example, the source core network control plane device may send the third NSSAI and the first indication information to the terminal device in the following manners:

Manner One: If the terminal device is in a connected state, the source core network control plane device delivers the third NSSAI and the first indication information to the terminal device by reallocating the temporary identifier of the terminal device.

Manner Two: If the terminal device is in an idle state, the source core network control plane device chooses to wait until the terminal device initiates a TAU procedure/service request procedure to complete registration with the source core network control plane device, and then the source core network control plane device delivers the third NSSAI and the first indication information to the terminal device by using a TAU accept message/service request complete message.

Manner Three: If the terminal device is in an idle state, the source core network control plane device may choose to page the terminal device, trigger the terminal device to initiate a service request and change from the idle state to a connected state, and send the third NSSAI and the first indication information to the terminal device in the first manner.

Optionally, the source core network control plane device may send the third NSSAI and the first indication information to the terminal device in another feasible manner. The foregoing plurality of possible implementations may be determined by the source core network control plane device according to a network policy. This is not limited in this application.

Optionally, before S503, this embodiment of this application further includes the following step:

S5031: The source core network control plane device sets the temporary identifier of the terminal device to be invalid.

For example, when determining that the first NSSAI of the terminal device cannot be determined, the source core network control plane device sets the temporary identifier of the terminal device to be invalid.

For example, a manner of setting, by the source core network control plane device, the temporary identifier of the terminal device to be invalid may be specifically: setting an invalid temporary identifier for the terminal device; or deleting the temporary identifier of the terminal device from a service list of the source core network control plane device.

Optionally, after S503, this embodiment of this application further includes the following step:

S5032: The source core network control plane device deregisters the terminal device from the source core network control plane device.

For example, when the source core network control plane device determines that the first NSSAI cannot be determined, it may be directly considered that the source core network control plane device cannot provide a service for the terminal device, and the source core network control plane device and the terminal device need to be isolated from each other. The terminal device may be directly deregistered from the source core network control plane device, so that the terminal device does not need to access a source network slice by using the source core network control plane device, the source network slice and the terminal device are isolated, and security of the network slice is improved.

S504: The terminal device sends a third registration request message to an access network device based on the third NSSAI and the first indication information, where the third registration request message carries the third NSSAI and a permanent identifier of the terminal device.

For example, the terminal device adds the permanent identifier of the terminal device and the third NSSAI to a NAS message, and an RRC message carries the third NSSAI and a PLMN selected by the terminal device. After receiving the RRC message, the access network device selects the default core network control plane device for the terminal device based on the third NSSAI and the PLMN that are carried in the RRC message.

S505: The default core network control plane device receives the third registration request message from the access network device.

For example, the terminal device sends the third registration request message to the access network device based on the received third NSSAI. The access network device determines a specific default core network control plane device for the terminal device based on the third NSSAI, and forwards the third registration request message to the default core network control plane device. The third registration request message carries the third NSSAI and the permanent identifier of the terminal device.

S506: The default core network control plane device obtains the subscription data of the terminal device from the subscriber data management center device based on the permanent identifier.

For example, the default core network control plane device sends the permanent identifier of the terminal device to the subscriber data management center device, and receives the subscription data of the terminal device returned by the subscriber data management center device.

S507: The default core network control plane device determines the target core network control plane device of the terminal device based on the subscription data.

For example, the default core network control plane device determines the first NSSAI of the terminal device based on the subscription data, and determines the target core network control plane device based on the first NSSAI and a PLMN selected by the terminal device.

S508: The default core network control plane device redirects the terminal device to the target core network control plane device.

After determining the target core network control plane device, the default core network control plane device redirects the terminal device to the target core network control plane device.

Optionally, a process of redirecting the terminal device to the target core network control plane device by the default core network control plane device specifically includes the following at least two feasible implementations:

Feasible Implementation One:

The default core network control plane device sends a first redirection indication message to the access network device, and the first redirection indication message is used to trigger the access network device to redirect the terminal device to the target core network control plane device.

For example, the default core network control plane device sends the first redirection indication message to the access network device, and the first redirection indication message carries the first NSSAI of the terminal device, identification information of the target core network control plane device, and the permanent identifier of the terminal device. After receiving the first redirection indication message, the access network device selects the target core network control plane device based on the identification information of the target core network control plane device that is carried in the first redirection indication message, and forwards the permanent identifier of the terminal device to the target core network control plane device, so that the target core network control plane device completes redirection of the terminal device.

Feasible Implementation Two:

The default core network control plane device sends a second redirection indication message to the target core network control plane device, and the second redirection indication message is used to trigger the target core network control plane device to complete redirection of the terminal device.

For example, the default core network control plane device directly sends the second redirection indication message to the target core network control plane device based on identification information of the target core network control plane device, and the second redirection indication message carries the first NSSAI of the terminal device and the permanent identifier of the terminal device, so that the target core network control plane device completes the redirection of the terminal device.

Still another aspect of this application further provides a core network control plane device and a terminal device that are configured to perform the core network control plane device selection methods provided in the embodiments shown in FIG. 2 to FIG. 5. The core network control plane device and the terminal device have a same technical feature and same technical effects as the core network control plane device selection methods, and details are not described in this application again.

Figure 6:
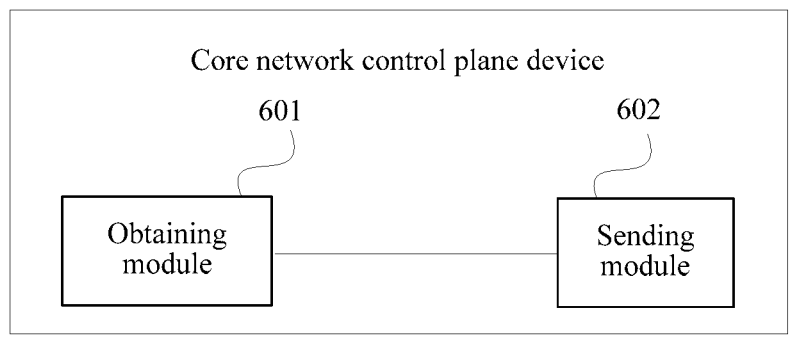
FIG. 6 is a schematic structural diagram of a core network control plane device according to an embodiment of this application.

FIG. 6 is a schematic structural diagram of a core network control plane device according to an embodiment of this application. The core network control plane device may be the source core network control plane device in the embodiments shown in FIG. 2 to FIG. 4, and the core network control plane device may be implemented by using software, hardware, or a combination of software and hardware. As shown in FIG. 6, the core network control plane device includes:

an obtaining module 601, configured to obtain first network slice selection assistance information of a terminal device; and a sending module 602, configured to: if the source core network control plane device cannot determine a target core network control plane device indexed by the first network slice selection assistance information, send, by the source core network control plane device, the first network slice selection assistance information and first indication information to the terminal device, to trigger the terminal device to send a first registration request message, where the first indication information is used to indicate that a temporary identifier of the terminal device is invalid, and the first registration request message carries the first network slice selection assistance information and a permanent identifier of the terminal device.

Figure 7:
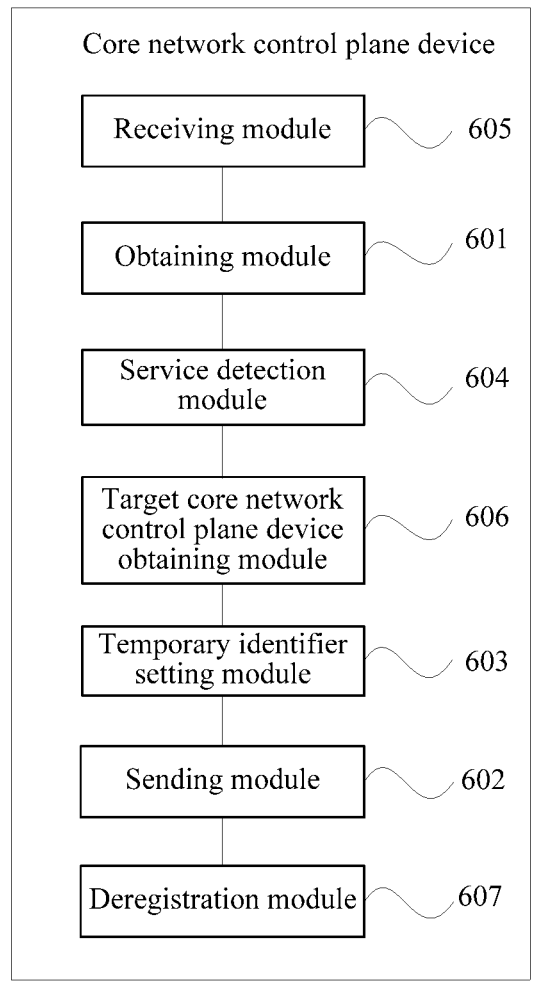
FIG. 7 is a schematic structural diagram of a core network control plane device according to another embodiment of this application.

Optionally, based on the embodiment shown in FIG. 6, FIG. 7 is a schematic structural diagram of a core network control plane device according to another embodiment of this application. As shown in FIG. 7, the core network control plane device further includes:

a temporary identifier setting module 603, configured to set the temporary identifier of the terminal device to be invalid.

Optionally, the obtaining module 601 is specifically configured to:

obtain subscription data of the terminal device from a subscriber data management center device; and determine the first network slice selection assistance information based on the subscription data.

Optionally, the obtaining module 601 is specifically configured to:

obtain subscription data of the terminal device from a subscriber data management center device;

send the subscription data to a default core network control plane device, to request the first network slice selection assistance information of the terminal device; and receive the first network slice selection assistance information from the default core network control plane device.

Optionally, as shown in FIG. 7, the core network control plane device further includes:

a service detection module 604, configured to determine, based on the first network slice selection assistance information, that the source core network control plane device cannot continue to serve the terminal device.

Optionally, as shown in FIG. 7, the core network control plane device further includes:

a receiving module 605, configured to receive a second registration request message from the terminal device, where the second registration request message carries second network slice selection assistance information, and the second network slice selection assistance information is used to index the source core network control plane device; and the service detection module 604 is specifically configured to: when it is determined that a slice type or a service type associated with the first network slice selection assistance information is not included in a slice type or a service type associated with the second network slice selection assistance information, determine that the source core network control plane device cannot continue to serve the terminal device.

Optionally, the core network control plane device further includes:

a target core network control plane device obtaining module 606, configured to: send the first network slice selection assistance information to a default core network control plane device, to request the target core network control plane device indexed by the first network slice selection assistance information; where if the request fails, it is determined that the source core network control plane device cannot determine the target core network control plane device indexed by the first network slice selection assistance information.

Optionally, the core network control plane device further includes:

a deregistration module 607, configured to deregister the terminal device from the source core network control plane device.

The deregistration module 607 is specifically configured to delete context information of the terminal device that is stored on the source core network control plane device.

Figure 8:
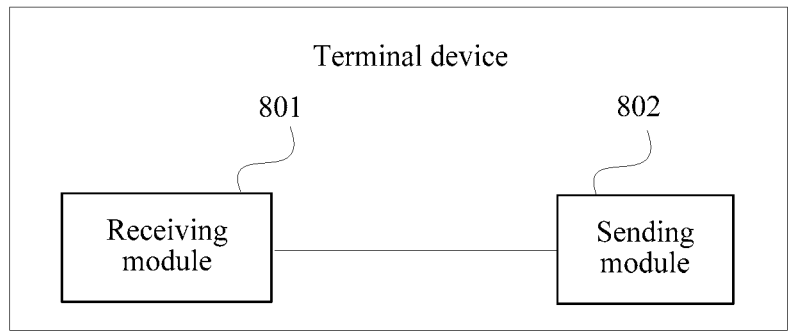
FIG. 8 is a schematic structural diagram of a terminal device according to an embodiment of this application.

FIG. 8 is a schematic structural diagram of a terminal device according to an embodiment of this application. The terminal device may be the terminal device in the embodiments shown in FIG. 2 to FIG. 4, and the terminal device may be implemented by using software, hardware, or a combination of software and hardware. As shown in FIG. 8, the terminal device includes:

a receiving module 801, configured to receive first network slice selection assistance information and first indication information from a source core network control plane device, where the first network slice selection assistance information is used to index a target core network control plane device, and the first indication information is used to indicate that a temporary identifier of the terminal device is invalid; and a sending module 802, configured to send a first registration request message to an access network device based on the first network slice selection assistance information and the first indication information.

The first registration request message carries the first network slice selection assistance information and a permanent identifier of the terminal device.

Figure 9:
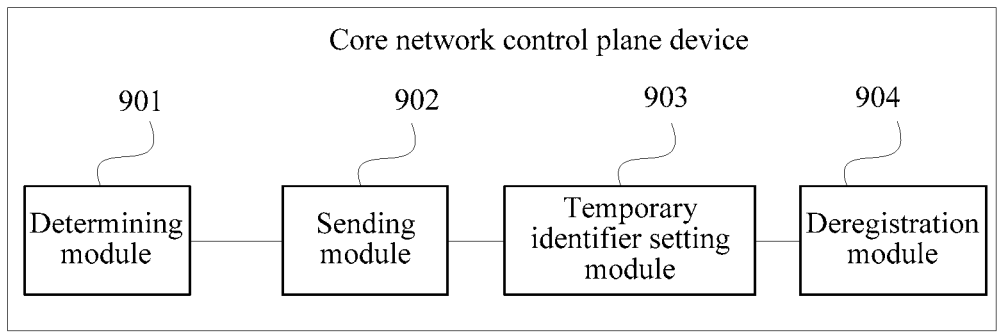
FIG. 9 is a schematic structural diagram of a core network control plane device according to an embodiment of this application.

FIG. 9 is a schematic structural diagram of a core network control plane device according to an embodiment of this application. The core network control plane device may be the source core network control plane device in the embodiment shown in FIG. 5, and the core network control plane device may be implemented by using software, hardware, or a combination of software and hardware. As shown in FIG. 9, the core network control plane device includes:

a determining module 901, configured to determine whether first network slice selection assistance information can be determined, where the first network slice selection assistance information is used to index a target core network control plane device; and a sending module 902, configured to: if the source core network control plane device cannot determine the first network slice selection assistance information, send third network slice selection assistance information and first indication information to a terminal device, to trigger the terminal device to send a third registration request message, where the first indication information is used to indicate that a temporary identifier of the terminal device is invalid, the third network slice selection assistance information is used to index a default core network control plane device, and the third registration request message carries the third network slice selection assistance information and a permanent identifier of the terminal device.

Optionally, the core network control plane device further includes:

a temporary identifier setting module 903, configured to: when the first network slice selection assistance information cannot be determined, set the temporary identifier of the terminal device to be invalid.

Optionally, the core network control plane device further includes:

a deregistration module 904, configured to deregister the terminal device from the source core network control plane device.

Figure 10:
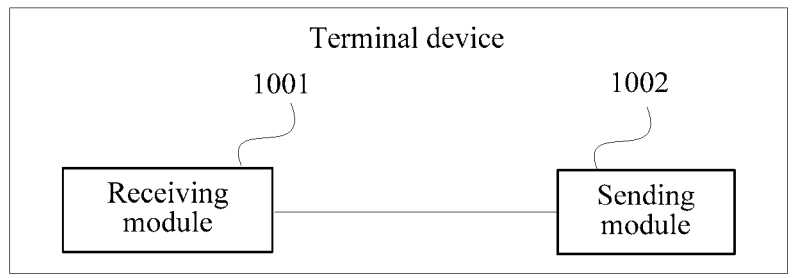
FIG. 10 is a schematic structural diagram of a terminal device according to an embodiment of this application.

FIG. 10 is a schematic structural diagram of a terminal device according to an embodiment of this application. The terminal device may be the terminal device in the embodiment shown in FIG. 5, and the terminal device may be implemented by using software, hardware, or a combination of software and hardware. As shown in FIG. 10, the terminal device includes:

a receiving module 1001, configured to receive third network slice selection assistance information and first indication information from a source core network control plane device, where the third network slice selection assistance information is used to index a default core network control plane device, and the first indication information is used to indicate that a temporary identifier of the terminal device is invalid; and a sending module 1002, configured to send a third registration request message to an access network device based on the third network slice selection assistance information and the first indication information.

The third registration request message carries the third network slice selection assistance information and a permanent identifier of the terminal device.

Figure 11:
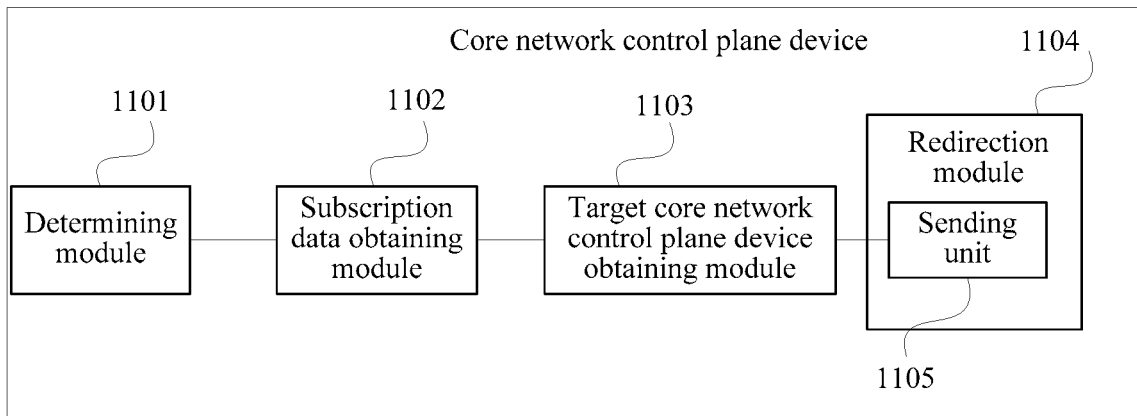
FIG. 11 is a schematic structural diagram of a core network control plane device according to an embodiment of this application.

FIG. 11 is a schematic structural diagram of a core network control plane device according to an embodiment of this application. The core network control plane device may be the default core network control plane device in the embodiment shown in FIG. 5, and the core network control plane device may be implemented by using software, hardware, or a combination of software and hardware. As shown in FIG. 11, the core network control plane device includes:

a receiving module 1101, configured to receive a third registration request message from an access network device, where the third registration request message carries a permanent identifier of a terminal device;

a subscription data obtaining module 1102, configured to obtain subscription data of the terminal device from a subscriber data management center device based on the permanent identifier;

a target core network control plane device obtaining module 1103, configured to determine a target core network control plane device of the terminal device based on the subscription data; and a redirection module 1104, configured to redirect the terminal device to the target core network control plane device.

In a possible implementation, the redirection module 1104 further includes:

a sending unit 1105, configured to: send a first redirection indication message to the access network device, where the first redirection indication message is used to trigger the access network device to redirect the terminal device to the target core network control plane device; or send a second redirection indication message to the target core network control plane device, where the second redirection indication message is used to trigger the target core network control plane device to complete redirection of the terminal device.

Still another aspect of this application further provides a core network control plane device and a terminal device that are configured to perform the core network control plane device selection methods provided in the embodiments shown in FIG. 2 to FIG. 5. The core network control plane device and the terminal device have a same technical feature and same technical effects as the core network control plane device selection methods, and details are not described in this application again.

Figure 12:
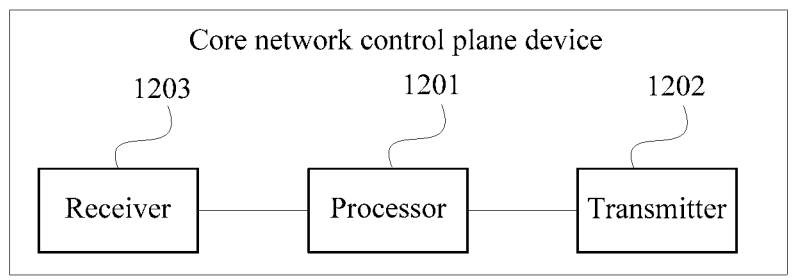
FIG. 12 is a schematic structural diagram of a core network control plane device according to an embodiment of this application.

FIG. 12 is a schematic structural diagram of a core network control plane device according to an embodiment of this application. The core network control plane device may be the source core network control plane device in the embodiments shown in FIG. 2 to FIG. 4. As shown in FIG. 12, the core network control plane device includes:

a processor 1201, configured to obtain first network slice selection assistance information of a terminal device; and a transmitter 1202, configured to: if the first core network control plane device cannot determine a second core network control plane device indexed by the first network slice selection assistance information, send, by the first core network control plane device, the first network slice selection assistance information and first indication information to the terminal device, to trigger the terminal device to send a first registration request message, where the first indication information is used to indicate that a temporary identifier of the terminal device is invalid, and the first registration request message carries the first network slice selection assistance information and a permanent identifier of the terminal device.

Optionally, the processor 1201 is further configured to set the temporary identifier of the terminal device to be invalid.

Optionally, the processor 1201 is specifically configured to:

obtain subscription data of the terminal device from a subscriber data management center device; and determine the first network slice selection assistance information based on the subscription data.

Optionally, the processor 1201 is specifically configured to obtain subscription data of the terminal device from a subscriber data management center device.

The transmitter is further configured to send the subscription data to a third core network control plane device, to request the first network slice selection assistance information of the terminal device.

The first core network control plane device further includes a receiver 1203.

The receiver is configured to receive the first network slice selection assistance information from the third core network control plane device.

Optionally, the processor 1201 is specifically configured to:

determine, based on the first network slice selection assistance information, that the first core network control plane device cannot continue to serve the terminal device.

Optionally, the receiver 1203 is further configured to:

receive a second registration request message from the terminal device, where the second registration request message carries second network slice selection assistance information, and the second network slice selection assistance information is used to index the first core network control plane device.

Optionally, the processor 1201 is further configured to:

when it is determined that a slice type or a service type associated with the first network slice selection assistance information is not included in a slice type or a service type associated with the second network slice selection assistance information, determine that the first core network control plane device cannot continue to serve the terminal device.

Optionally, the transmitter 1202 is further configured to:

send the first network slice selection assistance information to a third core network control plane device, to request the second core network control plane device indexed by the first network slice selection assistance information.

The processor 1201 is further configured to: if the request fails, determine that the first core network control plane device cannot determine the second core network control plane device indexed by the first network slice selection assistance information.

Optionally, the processor 1201 is further configured to: deregister the terminal device from the first core network control plane device.

Optionally, the processor 1201 is further configured to: delete context information of the terminal device that is stored on the first core network control plane device.

Figure 13:
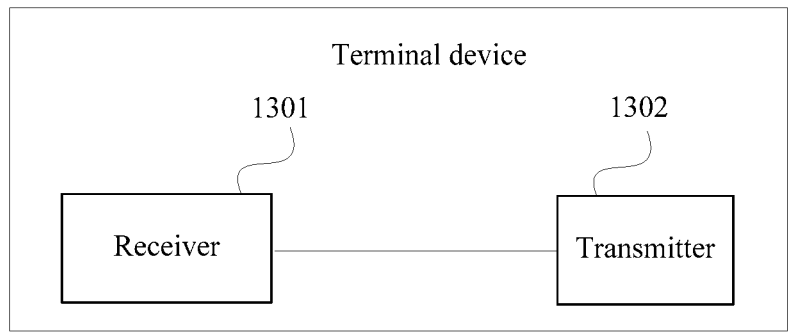
FIG. 13 is a schematic structural diagram of a terminal device according to an embodiment of this application.

FIG. 13 is a schematic structural diagram of a terminal device according to an embodiment of this application. The terminal device may be the terminal device in the embodiments shown in FIG. 2 to FIG. 4. As shown in FIG. 13, the terminal device includes:

a receiver 1301, configured to receive first network slice selection assistance information and first indication information from a first core network control plane device, where the first network slice selection assistance information is used to index a second core network control plane device, and the first indication information is used to indicate that a temporary identifier of the terminal device is invalid; and a transmitter 1302, configured to send a first registration request message to an access network device based on the first network slice selection assistance information and the first indication information.

The first registration request message carries the first network slice selection assistance information and a permanent identifier of the terminal device.

Figure 14:
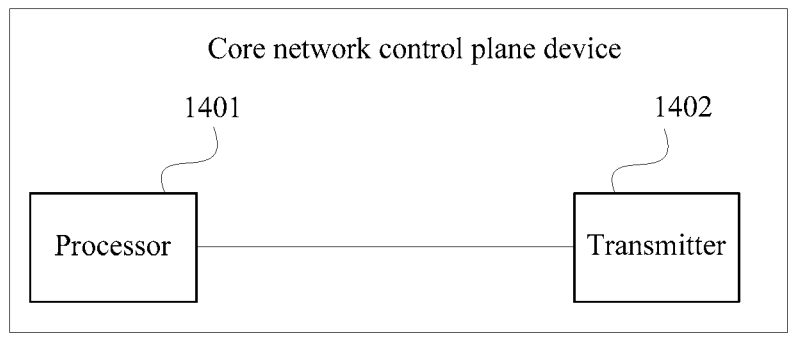
FIG. 14 is a schematic structural diagram of a core network control plane device according to an embodiment of this application.

FIG. 14 is a schematic structural diagram of a core network control plane device according to an embodiment of this application. The core network control plane device may be the source core network control plane device in the embodiment shown in FIG. 5. As shown in FIG. 14, the core network control plane device includes:

a processor 1401, configured to determine whether first network slice selection assistance information can be determined, where the first network slice selection assistance information is used to index a fifth core network control plane device; and a transmitter 1402, configured to: if the source core network control plane device cannot determine the first network slice selection assistance information, send third network slice selection assistance information and first indication information to a terminal device, to trigger the terminal device to send a third registration request message, where the first indication information is used to indicate that a temporary identifier of the terminal device is invalid, the third network slice selection assistance information is used to index a sixth core network control plane device, and the third registration request message carries the third network slice selection assistance information and a permanent identifier of the terminal device.

Optionally, the processor 1401 is further configured to set the temporary identifier of the terminal device to be invalid.

Optionally, the processor 1401 is further configured to deregister the terminal device from the fourth core network control plane device.

Figure 15:
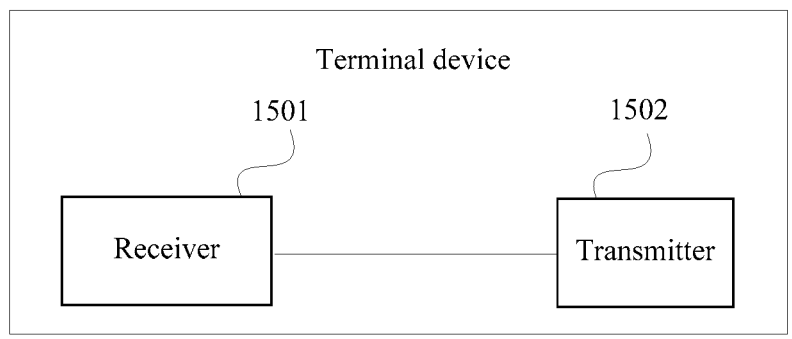
FIG. 15 is a schematic structural diagram of a terminal device according to an embodiment of this application.

FIG. 15 is a schematic structural diagram of a terminal device according to an embodiment of this application. The terminal device may be the terminal device in the embodiment shown in FIG. 5. As shown in FIG. 15, the terminal device includes:

a receiver 1501, configured to receive third network slice selection assistance information and first indication information from a fourth core network control plane device, where the third network slice selection assistance information is used to index a sixth core network control plane device, and the first indication information is used to indicate that a temporary identifier of the terminal device is invalid; and a transmitter 1502, configured to send a third registration request message to an access network device based on the third network slice selection assistance information and the first indication information.

The third registration request message carries the third network slice selection assistance information and a permanent identifier of the terminal device.

Figure 16:
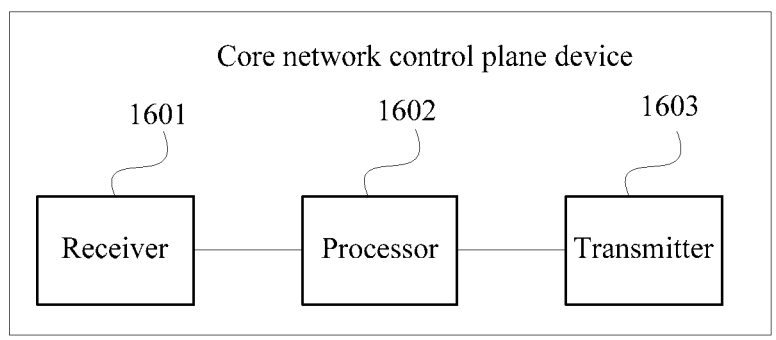
FIG. 16 is a schematic structural diagram of a core network control plane device according to an embodiment of this application.

FIG. 16 is a schematic structural diagram of a core network control plane device according to an embodiment of this application. The core network control plane device may be the default core network control plane device in the embodiment shown in FIG. 5. As shown in FIG. 16, the core network control plane device includes:

a receiver 1601, configured to receive a third registration request message from an access network device, where the third registration request message carries a permanent identifier of a terminal device; and a processor 1602, configured to obtain subscription data of the terminal device from a subscriber data management center device based on the permanent identifier.

The processor 1602 is further configured to determine a fifth core network control plane device of the terminal device based on the subscription data.

The processor 1602 is further configured to redirect the terminal device to the fifth core network control plane device.

Optionally, the core network control plane device further includes:

a transmitter 1603, configured to: send a first redirection indication message to the access network device, where the first redirection indication message is used to trigger the access network device to redirect the terminal device to the fifth core network control plane device; or send a second redirection indication message to the fifth core network control plane device, where the second redirection indication message is used to trigger the fifth core network control plane device to complete redirection of the terminal device.

In addition, it should be noted that the module division of the foregoing core network control plane device and terminal device is merely logical function division and may be other division during actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in this application may be integrated into one processing unit, or each of the units may exist alone physically, or two or more units are integrated into one unit. The integrated unit may be implemented in a form of hardware, or may be implemented in a form of hardware in addition to a software functional unit.

An embodiment of this application further provides a program. The program is configured to perform, when executed by a processor, the method on the source core network control plane device side in the embodiments shown in FIG. 2 to FIG. 4. An embodiment of this application further provides a program product, for example, a computer-readable storage medium, including the foregoing program. An embodiment of this application further provides a computer-readable storage medium. The computer-readable storage medium stores an instruction. When the instruction is run on a computer, the instruction causes the computer to perform the method on the source core network control plane device side in the embodiments shown in FIG. 2 to FIG. 4.

An embodiment of this application further provides a program. The program is configured to perform, when executed by a processor, the terminal-device-side method in the embodiments shown in FIG. 2 to FIG. 4. An embodiment of this application further provides a program product, for example, a computer-readable storage medium, including the foregoing program. An embodiment of this application further provides a computer-readable storage medium. The computer-readable storage medium stores an instruction. When the instruction is run on a computer, the instruction causes the computer to perform the terminal-device-side method in the embodiments shown in FIG. 2 to FIG. 4.

An embodiment of this application further provides a program. The program is configured to perform, when executed by a processor, the method on the default core network control plane device side in the embodiments shown in FIG. 2 to FIG. 4. An embodiment of this application further provides a program product, for example, a computer-readable storage medium, including the foregoing program. An embodiment of this application further provides a computer-readable storage medium. The computer-readable storage medium stores an instruction. When the instruction is run on a computer, the instruction causes the computer to perform the method on the default core network control plane device side in the embodiments shown in FIG. 2 to FIG. 4.

An embodiment of this application further provides a program. The program is configured to perform, when executed by a processor, the method on the source core network control plane device side in the embodiment shown in FIG. 5. An embodiment of this application further provides a program product, for example, a computer-readable storage medium, including the foregoing program. An embodiment of this application further provides a computer-readable storage medium. The computer-readable storage medium stores an instruction. When the instruction is run on a computer, the instruction causes the computer to perform the method on the source core network control plane device side in the embodiment shown in FIG. 5.

An embodiment of this application further provides a program. The program is configured to perform, when executed by a processor, the terminal-device-side method in the embodiment shown in FIG. 5. An embodiment of this application further provides a program product, for example, a computer-readable storage medium, including the foregoing program. An embodiment of this application further provides a computer-readable storage medium. The computer-readable storage medium stores an instruction. When the instruction is run on a computer, the instruction causes the computer to perform the terminal-device-side method in the embodiment shown in FIG. 5.

An embodiment of this application further provides a program. The program is configured to perform, when executed by a processor, the method on the default core network control plane device side in the embodiment shown in FIG. 5. An embodiment of this application further provides a program product, for example, a computer-readable storage medium, including the foregoing program. An embodiment of this application further provides a computer-readable storage medium. The computer-readable storage medium stores an instruction. When the instruction is run on a computer, the instruction causes the computer to perform the method on the default core network control plane device side in the embodiment shown in FIG. 5.

What is claimed is:

1. A core network control plane device selection method, comprising:
    receiving, by a terminal device, first network slice selection assistance information and first indication information from a source core network control plane device, wherein the first network slice selection assistance information indexes a target core network control plane device, and the first indication information indicates that a temporary identifier of the terminal device is invalid; and
    sending, by the terminal device, a first registration request message to an access network device based on the first network slice selection assistance information and the first indication information, wherein the first registration request message carries the first network slice selection assistance information and a permanent identifier of the terminal device.

2. The method according to claim 1, wherein the permanent identifier comprises a subscriber permanent identifier (SUPI) of the terminal device.

3. The method according to claim 1, wherein the source core network control plane device comprises a source access and mobility management function (AMF) device, and the target core network control plane device comprises a target AMF device.

4. The method according to claim 1, wherein the first network slice selection assistance information and the permanent identifier of the terminal device are sent in a Radio Resource Control (RRC) message.

5. The method according to claim 1, wherein the method further comprises:
    sending, by the terminal device, a second registration request message to the source core network control plane device, wherein the second registration request message carries second network slice selection assistance information, and the second network slice selection assistance information indexes the source core network control plane device.

6. The method according to claim 5, wherein a slice type or a service type associated with the first network slice selection assistance information is not comprised in a slice type or a service type associated with the second network slice selection assistance information.

7. A terminal device, comprising:
    a receiver configured to receive first network slice selection assistance information and first indication information from a source core network control plane device, wherein the first network slice selection assistance information indexes a target core network control plane device, and the first indication information indicates that a temporary identifier of the terminal device is invalid; and a transmitter configured to send a first registration request message to an access network device based on the first network slice selection assistance information and the first indication information, wherein the first registration request message carries the first network slice selection assistance information and a permanent identifier of the terminal device.

8. The terminal device according to claim 7, wherein the permanent identifier comprises a subscriber permanent identifier (SUPI) of the terminal device.

9. The terminal device according to claim 7, wherein the source core network control plane device comprises a source access and mobility management function (AMF) device, and the target core network control plane device comprises a target AMF device.

10. The terminal device according to claim 7, wherein the first network slice selection assistance information and the permanent identifier of the terminal device are sent in a Radio Resource Control (RRC) message.

11. The terminal device according to claim 7, wherein the transmitter is further configured to send a second registration request message to the source core network control plane device, wherein the second registration request message carries second network slice selection assistance information, and the second network slice selection assistance information indexes the source core network control plane device.

12. The terminal device according to claim 11, wherein a slice type or a service type associated with the first network slice selection assistance information is not comprised in a slice type or a service type associated with the second network slice selection assistance information.

13. A non-transitory computer-readable medium storing computer instructions for execution by one or more processors, wherein the computer instructions instruct the one or more processors to perform operations comprising:

receiving first network slice selection assistance information and first indication information from a source core network control plane device, wherein the first network slice selection assistance information indexes a target core network control plane device, and the first indication information indicates that a temporary identifier of a terminal device is invalid; and sending a first registration request message to an access network device based on the first network slice selection assistance information and the first indication information, wherein the first registration request message carries the first network slice selection assistance information and a permanent identifier of the terminal device.

* * * * *